(12) United States Patent
Kopp

(10) Patent No.: US 10,753,444 B2
(45) Date of Patent: Aug. 25, 2020

(54) SUMMING AND FAULT TOLERANT ROTARY ACTUATOR ASSEMBLY

(71) Applicant: Moog Inc., East Aurora, NY (US)

(72) Inventor: John Kopp, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 100 days.

(21) Appl. No.: 16/068,835

(22) PCT Filed: Jan. 13, 2017

(86) PCT No.: PCT/US2017/013493
§ 371 (c)(1),
(2) Date: Jul. 9, 2018

(87) PCT Pub. No.: WO2017/123987
PCT Pub. Date: Jul. 20, 2017

(65) Prior Publication Data
US 2019/0063574 A1    Feb. 28, 2019

Related U.S. Application Data

(60) Provisional application No. 62/278,242, filed on Jan. 13, 2016.

(51) Int. Cl.
*F16H 21/44* (2006.01)
*B64C 27/605* (2006.01)
(Continued)

(52) U.S. Cl.
CPC ............ *F16H 37/122* (2013.01); *B64C 11/32* (2013.01); *B64C 11/44* (2013.01); *B64C 27/72* (2013.01);
(Continued)

(58) Field of Classification Search
CPC ...... F16H 37/122; F16H 37/0806; F16H 1/28; F16H 1/46; F16H 21/44; B64C 27/72;
(Continued)

(56) References Cited

U.S. PATENT DOCUMENTS 1,294,971 A    2/1919  Tripp
2,652,995 A    9/1953  Swain et al.
(Continued)

FOREIGN PATENT DOCUMENTS

CN    1154325 A    7/1997
CN    1705835 A    12/2005
(Continued)

OTHER PUBLICATIONS

Recksiek, Advanced High Lift System Architecture with Distributed Electrical Flap Actuation, AST 2009, Mar. 29-30, Hamburg, Germany.
(Continued)

*Primary Examiner* — Victor L MacArthur
*Assistant Examiner* — T. Scott Fix
(74) *Attorney, Agent, or Firm* — Harter Secrest & Emery LLP

(57) ABSTRACT

An actuator assembly comprising an output member rotatable about an output axis, first and second actuators each having an axis of rotation, a drive motor and a hold motor, first and second linkages between each of the first and second actuators and the output member, wherein a torque produced by a drive motor is summed through the linkages at the output member when the respective hold motor is restrained from rotating, and wherein the respective hold motor may be selectively released so that it rotates with a failure of the respective drive motor, and wherein one of the first or second actuators may be driven to selectively rotate the output member with a failure of the drive motor of the other of the first or second actuators. The assembly may comprise a third actuator linked to the output member in the same manner as the first and second actuators.

26 Claims, 17 Drawing Sheets

(51) Int. Cl.
  *H02K 7/116* (2006.01)
  *B64C 11/32* (2006.01)
  *F16H 37/12* (2006.01)
  *F16H 1/46* (2006.01)
  *B64C 29/00* (2006.01)
  *B64C 27/72* (2006.01)
  *B64C 11/44* (2006.01)
  *F16H 1/28* (2006.01)
  *F16H 37/08* (2006.01)
  *B64C 13/50* (2006.01)

(52) U.S. Cl.
  CPC .......... *B64C 29/0033* (2013.01); *F16H 1/28* (2013.01); *F16H 1/46* (2013.01); *F16H 21/44* (2013.01); *H02K 7/116* (2013.01); *B64C 13/505* (2018.01); *B64C 27/605* (2013.01); *B64C 2027/7211* (2013.01); *F16H 37/0806* (2013.01); *H02K 2213/06* (2013.01); *Y02T 50/34* (2013.01)

(58) Field of Classification Search
  CPC . B64C 27/605; B64C 13/505; B64C 29/0033; B64C 2027/7211; H02K 7/116; H02K 2213/06; Y02T 50/34
  USPC .......................................................... 74/89
  See application file for complete search history.

(56) References Cited

U.S. PATENT DOCUMENTS

| | | | |
|---|---|---|---|
| 2,695,145 | A | 11/1954 | Lear et al. |
| 2,855,793 | A | 10/1958 | Parker et al. |
| 3,438,447 | A | 4/1969 | Ferris |
| 3,523,460 | A | 8/1970 | Beauvias |
| 3,561,784 | A | 2/1971 | Bantle |
| 3,612,106 | A | 10/1971 | Andre et al. |
| 4,225,110 | A | 9/1980 | Akkerman et al. |
| 4,228,386 | A | 10/1980 | Griffith |
| 4,274,808 | A | 6/1981 | Garner et al. |
| 4,362,085 | A | 12/1982 | Venuti, Jr. |
| 4,445,421 | A | 5/1984 | Walker et al. |
| 4,531,448 | A | 7/1985 | Barnes |
| 4,555,978 | A | 12/1985 | Burandt et al. |
| 4,605,358 | A | 8/1986 | Burandt et al. |
| 4,685,550 | A | 8/1987 | Metcalf |
| 4,742,730 | A * | 5/1988 | Dorn .................. F16H 1/28 475/332 |
| 4,808,955 | A | 2/1989 | Godkin et al. |
| 4,858,491 | A | 8/1989 | Shube |
| 5,120,285 | A | 6/1992 | Grimm |
| 5,152,381 | A | 10/1992 | Appleberry |
| 5,154,372 | A * | 10/1992 | Hora .................. F01D 1/24 244/62 |
| 5,183,387 | A * | 2/1993 | Huggett .................. B64C 11/32 188/164 |
| 5,518,466 | A | 5/1996 | Tiedeman |
| 5,628,234 | A | 5/1997 | Crook et al. |
| 5,678,786 | A | 10/1997 | Osder |
| 5,701,801 | A | 12/1997 | Boehringer et al. |
| 5,806,806 | A | 9/1998 | Boehringer et al. |
| 5,915,649 | A | 6/1999 | Head |
| 5,957,798 | A | 9/1999 | Smith, III et al. |
| 6,189,436 | B1 | 2/2001 | Brooks |
| 6,981,439 | B2 | 1/2006 | Hart |
| 8,070,091 | B2 * | 12/2011 | Benson .................. B64C 27/605 244/17.13 |
| 2004/0080197 | A1 | 4/2004 | Kopetzky |
| 2004/0238688 | A1 | 12/2004 | Audren |
| 2006/0138829 | A1 | 6/2006 | Kopetzky et al. |
| 2006/0169130 | A1 | 8/2006 | Yoo |
| 2006/0255207 | A1 | 11/2006 | Wingett et al. |
| 2007/0018040 | A1 | 1/2007 | Wingett et al. |
| 2007/0068291 | A1 | 3/2007 | Beatty et al. |
| 2007/0262194 | A1 | 11/2007 | Agrawal et al. |
| 2008/0025770 | A1 | 1/2008 | Burnett |
| 2008/0098942 | A1 | 5/2008 | Morse et al. |
| 2008/0203223 | A1 | 8/2008 | Cyrot et al. |
| 2009/0108130 | A1 | 3/2009 | Flatt |
| 2009/0090238 | A1 | 4/2009 | Friedrich |
| 2009/0260514 | A1 | 10/2009 | Lezock et al. |
| 2009/0314884 | A1 | 12/2009 | Elliot et al. |
| 2011/0041632 | A1 | 2/2011 | Baker et al. |
| 2013/0120036 | A1 | 5/2013 | Zhu et al. |
| 2014/0260722 | A1 | 9/2014 | Kopp et al. |
| 2014/0360348 | A1 | 12/2014 | Kopp et al. |
| 2015/0081102 | A1 | 3/2015 | Kopp |

FOREIGN PATENT DOCUMENTS

| | | |
|---|---|---|
| CN | 1827474 A | 9/2006 |
| DE | 10021324 A1 | 11/2001 |
| DE | 102010024121 A1 | 12/2011 |
| EP | 0382903 A2 | 8/1990 |
| EP | 0826902 A2 | 3/1998 |
| EP | 1721826 A1 | 11/2006 |
| FR | 70758 E | 7/1959 |
| FR | 2706966 A | 12/1994 |
| FR | 2906220 A1 | 3/2008 |
| GB | 593642 A | 10/1947 |
| GB | 730561 A | 5/1955 |
| GB | 1500404 A | 2/1978 |
| JP | S5077044 A | 6/1975 |
| JP | S61157870 A | 7/1986 |
| JP | H03113156 A | 5/1991 |
| JP | H10141499 A | 5/1998 |
| JP | 2001271808 A | 10/2001 |
| JP | 2006522295 A | 9/2006 |
| JP | 2007176486 A | 7/2007 |
| JP | 2008137436 A | 6/2008 |
| WO | 1985004459 A1 | 10/1985 |
| WO | 2008028184 A2 | 3/2008 |
| WO | 2009020452 A1 | 2/2009 |
| WO | 2009153236 A2 | 12/2009 |
| WO | 2010078082 A1 | 7/2010 |
| WO | 2013119242 A1 | 8/2013 |
| WO | 20130120036 A1 | 8/2013 |

OTHER PUBLICATIONS

Charrier, Electric Actuation for Flight & Engine Control: Evolution & Challenges, SAE-ACGSC Mtg 99, Feb. 28-Mar. 2, 2007 Boulder Meeting.

Wu et al., Fault-Tolerant Joint Development for the Space Shuttle Remote Manipulator System: Analysis and Experiment, Robotics and Automation, IEEE Transactions, Oct. 1993, vol. 9, Issue 5, Houston, Texas.

Liscouet et al., Evaluation of Architectures for Electromechanical Actuators, 26th International Congress of the Aeronautical Sciences, 2008.

The International Search Report (ISR) and Written Opinion of the searching authority for PCt Application Serial No. PCT/US2017/013493; completed Jun. 6, 2017.

Seemann, S. et al, Modeling and Simulation of a Fault-Tolerant Electromechanical Actuation System for Helicopter Swashplates in Modelica Sep. 3, 2012.

Claeyssen, F. et al., New Actuators for Aircraft, Space and Military Applications Jun. 14, 2010.

Christmann, M. et al., Innovative Approaches to Electromechanical Flight Control Actuators and Systems May 7, 2010.

* cited by examiner

US 10,753,444 B2

SUMMING AND FAULT TOLERANT ROTARY ACTUATOR ASSEMBLY

TECHNICAL FIELD

The present invention relates generally to the field of actuator systems, and more specifically to an electromechanical redundant actuator system.

BACKGROUND ART

Redundant actuator systems are generally known. These systems typically arrange multiple actuators in a way in which their displacement is summed, or their torque is summed.

U.S. Pat. No. 9,086,125, issued Jul. 21, 2015, and entitled "Rotary Actuator" is directed to an actuator system having multiple actuators and multiple linkages with independent degrees of freedom. The entire contents of U.S. Pat. No. 9,086,125 are incorporated herein by reference.

U.S. Patent Application Publication No. US 2015/0081102, published Mar. 19, 2015, and entitled "Actuator System and Method," is directed to an actuator system having multiple actuators and linkages, including a shared link, to rotate a controlled element. The entire contents of U.S. Patent Application Publication No. 2015/0081102 are incorporated herein by reference.

SUMMARY

With parenthetical reference to the corresponding parts, portions or surfaces of the disclosed embodiment, merely for the purposes of illustration and not by way of limitation, the present invention provides a rotary actuator assembly (15) comprising: an output member (10) configured to impart a limited range of rotary motion to a driven object about a rotary output axis (11) relative to a structure (9, 12); a first sub-actuator (102) having a first sub-axis of rotation (103) and a first sub-actuator housing (170), the first sub-actuator housing (170) being substantially free to rotate about the first sub-axis of rotation (103) relative to the structure (9); the first sub-actuator (102) comprising a first stator element (124) and a first rotor (104) configured to selectively rotate about the first sub-axis of rotation (103) relative to the first sub-actuator housing (170); a first drive axis (108) defined by an imaginary line extending between the output axis (11) and the first sub-axis of rotation (103); a first member (105) connected to the first rotor and having a first member pivot axis (106), the first member pivot axis (106) offset a distance from the first sub-axis of rotation (103); a first linkage (107) connected to the first member at the first member pivot axis (106) and connected to the output member (10) at a first output pivot axis (100), the first output pivot axis (100) offset a distance from the output axis (11); the first linkage (107) having a first linkage axis (109) defined by an imaginary line extending between the first output pivot axis (100) and the first member pivot axis (106); the output member (10), the first member (105) of the first sub-actuator (102) and the first linkage (107) of the first sub-actuator (102) configured such that the first linkage axis (109) does not intersect the first drive axis (108) with rotation of the output member (10) about the output axis (11) within the range of rotary motion; the first sub-actuator (102) comprising a second stator element (134) and a second rotor (114) configured to selectively rotate about the first sub-axis of rotation (103) relative to the first sub-actuator housing (170); a second member (115) connected to the second rotor (114) and having a second member pivot axis (116), the second member pivot axis (116) offset a distance from the first sub-axis of rotation (103); a second linkage (117) connected to the second member (115) at the second member pivot axis (116) and connected to the output member (10) at a second output pivot axis (101), the second output pivot axis (101) offset a distance from the output axis (11); the second linkage (117) having a second linkage axis (119) defined by an imaginary line extending between the second output pivot axis (101) and the second member pivot axis (116); the output member (10), the second member (115) of the first sub-actuator (102) and the second linkage (117) of the first sub-actuator (102) configured such that the second linkage axis (119) intersects the first drive axis (108) with rotation of the output member (10) about the output axis (11) within the range of rotary motion; wherein a torque produced by the first rotor (104) is transferred through the first linkage axis (109) and the second linkage axis (119) and thereby summed at the output axis (11) when the second rotor (114) is restrained from rotating relative to the first sub-actuator housing (170) within the range of rotary motion; wherein the second rotor (114) may be selectively released so that it is substantially free to rotate about the first sub-axis of rotation (103) relative to the first sub-actuator housing (170) with a failure of the first rotor (104) to rotate about the first sub-axis of rotation (103) relative to the first sub-actuator housing (170), such that the first linkage axis (109) and the second linkage axis (119) are substantially free to move with rotation of the output member (10) about the output axis (11) relative to the structure (9) within the range of rotary motion; a second sub-actuator (202) having a second sub-axis of rotation (203) and a second sub-actuator housing (270), the second sub-actuator housing (270) being substantially free to rotate about the second sub-axis of rotation (203) relative to the structure (9); the second sub-actuator (202) comprising a third stator element (224) and a third rotor (204) configured to selectively rotate about the second sub-axis of rotation (203) relative to the second sub-actuator housing (270); a second drive axis (208) defined by an imaginary line extending between the output axis (11) and the second sub-axis of rotation (203); a third member (205) connected to the third rotor (204) and having a third member pivot axis (206), the third member pivot axis (206) offset a distance from the second sub-axis of rotation (203); a third linkage (207) connected to the third member (205) at the third member pivot axis (206) and connected to the output member (10) at a third output pivot axis (200), the third output pivot axis (200) offset a distance from the output axis (11); the third linkage (207) having a third linkage axis (209) defined by an imaginary line extending between the third output pivot axis (200) and the third member pivot axis (206); the output member (10), the third member (205) of the second sub-actuator (202) and the third linkage (207) of the second sub-actuator (202) configured such that the third linkage axis (209) does not intersect the second drive axis (208) with rotation of the output member (10) about the output (11) within the range of rotary motion; the second sub-actuator (202) comprising a fourth stator element (234) and a fourth rotor (214) configured to selectively rotate about the second sub-axis of rotation (203) relative to the second sub-actuator housing (270); a fourth member (215) connected to the fourth rotor (214) and having a fourth member pivot axis (216), the fourth member pivot axis (216) offset a distance from the second sub-axis of rotation (203); a fourth linkage (217) connected to the fourth member (215) at the fourth member pivot axis (216) and connected to the output member (10) at a fourth output pivot axis (201), the fourth output pivot axis (201) offset a distance from the output axis (11); the fourth linkage (217) having a fourth linkage axis (219) defined by an imaginary line extending between the fourth output pivot axis (201) and the fourth member pivot axis (216); the output member (10), the fourth member (215) of the second sub-actuator (202) and the fourth linkage (217) of the second sub-actuator (202) configured such that the fourth linkage axis (219) intersects the second drive axis (208) with rotation of the output member (10) about the output axis (11) within the range of rotary motion; wherein a torque produced by the third rotor (204) is transferred through the third linkage axis (209) and the fourth linkage axis (219) and thereby summed at the output axis (11) when the fourth rotor (214) is restrained from rotating relative to the second sub-actuator housing (270) within the range of rotary motion; wherein the fourth rotor (214) may be selectively released so that it is substantially free to rotate about the second sub-axis of rotation (203) relative to the second sub-actuator housing (270) with a failure of the third rotor (204) to rotate about the second sub-axis of rotation (203) relative to the second sub-actuator housing (270) such that the third linkage axis (209) and the fourth linkage axis (219) are substantially free to move with rotation of the output member (10) about the output axis (11) relative to the structure (9) within the range of rotary motion; and wherein one of the first sub-actuator (102) or the second sub-actuator (202) may be driven to selectively rotate the output member (10) about the output axis (11) with a failure of the first rotor (104) or the third rotor (204) of the other of the first sub-actuator (102) and the second sub-actuator (202) to rotate about the respective first sub-axis of rotation (103) or the second sub-axis of rotation (203) relative to the respective first sub-actuator housing (170) or the second sub-actuator housing (270) within the range of rotary motion.

The rotary actuator assembly may further comprising: a third sub-actuator (302) having a third sub-axis of rotation (303) and a third sub-actuator housing (370), the third sub-actuator housing (370) being substantially free to rotate about the third sub-axis of rotation (303) relative to the structure (9); the third sub-actuator (302) comprising a fifth stator element (324) and a fifth rotor (304) configured to selectively rotate about the third sub-axis of rotation (303) relative to the second sub-actuator housing (370); a third drive axis (308) defined by an imaginary line extending between the output axis (11) and the third sub-axis of rotation (303); a fifth member (305) connected to the fifth rotor (304) and having a fifth member pivot axis (306), the fifth member pivot axis (306) offset a distance from the third sub-axis of rotation (303); a fifth linkage (307) connected to the fifth member (305) at the fifth member pivot axis (306) and connected to the output member (10) at a fifth output pivot axis (300), the fifth output pivot axis (300) offset a distance from the output axis (11); the fifth linkage (307) having a fifth linkage axis (309) defined by an imaginary line extending between the fifth output pivot axis (300) and the fifth member pivot axis (306); the output member (10), the fifth member (305) of the third sub-actuator (302) and the fifth linkage (307) of the third sub-actuator (302) configured such that the fifth linkage axis (309) does not intersect the third drive axis (308) with rotation of the output member (10) about the output (11) within the range of rotary motion; the third sub-actuator (302) comprising a sixth stator element (334) and a sixth rotor (314) configured to selectively rotate about the third sub-axis of rotation (303) relative to the third sub-actuator housing (370); a sixth member (315) connected to the sixth rotor (314) and having a sixth member pivot axis (316), the sixth member pivot axis (316) offset a distance from the third sub-axis of rotation (303); a sixth linkage (317) connected to the sixth member (315) at the sixth member pivot axis (316) and connected to the output member (10) at a sixth output pivot axis (301), the sixth output pivot axis (301) offset a distance from the output axis (11); the sixth linkage (317) having a sixth linkage axis (319) defined by an imaginary line extending between the sixth output pivot axis (301) and the sixth member pivot axis (316); the output member (10), the sixth member (315) of the third sub-actuator (302) and the sixth linkage (317) of the third sub-actuator (302) configured such that the sixth linkage axis (319) intersects the third drive axis (308) with rotation of the output member (10) about the output (11) within the range of rotary motion; wherein a torque produced by the fifth rotor is transferred through the fifth linkage axis (309) and the sixth linkage axis (319) and thereby summed at the output axis (11) when the sixth motor (334) is restrained from rotating relative to the third sub-actuator housing (370) within the range of rotary motion; wherein the sixth rotor (314) may be selectively released so that it is substantially free to rotate about the third sub-axis of rotation (303) relative to the third sub-actuator housing (370) with a failure of the fifth rotor (304) to rotate about the third sub-axis of rotation (303) relative to the third sub-actuator housing (370) such that the fifth linkage axis (309) and the sixth linkage axis (319) are substantially free to move with rotation of the output member (10) about the output axis (11) relative to the structure (9) within the range of rotary motion; and wherein one of the first sub-actuator (102), the second sub-actuator (202) or the third sub-actuator (302) may be driven to selectively rotate the output member (10) about the output axis (11) with a failure of one or more of the first rotor (104), the third rotor (204) or the fifth rotor (304) of the other of the first sub-actuator (102), the second sub-actuator (202) or the third sub-actuator (302) to rotate about the respective first sub-axis of rotation (103), the second sub-axis of rotation (203) and the third sub-axis of rotation (303) relative to the respective first sub-actuator housing (170), the second sub-actuator housing (270) or the third sub-actuator housing (370) within the range of rotary motion.

The driven object may comprise a swashplate (22) of a helicopter and the output member (10) may be connected to the swashplate via a pushrod (21). The rotary actuator system may comprise a crank (19) between the output member (10) and the pushrod (21). The driven object may comprise a helicopter rotor blade (423A, 423B, 423C) and the output member (10) may be connected to the rotor blade (423A, 423B, 423C) and configured to control a pitch angle of the rotor blade (423A, 423B, 423C). The rotary actuator system may comprise a grip (419A, 419B, 419C) between the output member (10) and the rotor blade (423A, 423B, 423C). The driven object may comprise an aircraft flight control surface (30) and the output member may be connected to the flight control surface via a torque tube (31). The flight control surface may be selected from a group consisting of an elevator, a rudder, an aileron, a flap, a slat, a spoiler, and a helicopter flying tail. The driven object may comprise a rotor nacelle (523) of a tiltrotor (20).

The range of motion may be less than or equal to about 90 degrees about the rotary output axis. The first sub-axis of rotation (103), the second sub-axis of rotation (203) and the rotary output axis (11) may be substantially parallel. The first sub-axis of rotation (103), the second sub-axis of rotation (203), the rotary output axis (11), the first member pivot axis (106), the second member pivot axis (116), the third member pivot axis (206), the fourth member pivot axis (216), the first output pivot axis (100), the second output pivot axis (101), the third output pivot axis (200), and the fourth output pivot axis (200) may be all substantially parallel.

The first stator element (124) and the second stator element (134) may be fixed to the first sub-actuator housing (170) via an interference fit and the third stator element (224) and the fourth stator element (234) may be fixed to the second sub-actuator housing (270) via an interference fit.

The first rotor (104) and the first stator (124) may comprise a brushless DC permanent magnet motor configured to drive the first rotor (104) about the first sub-axis of rotation (103) relative to the first sub-actuator housing (170). The third rotor (204) and the third stator (224) may comprise a brushless DC permanent magnet motor configured to drive the third rotor (204) about the second sub-axis of rotation (203) relative to the second sub-actuator housing (270). The second rotor (114) and the second stator (134) may comprise an electromagnetic reluctance hold device configured to selectively restrain the second rotor (114) from rotating about the first sub-axis of rotation (103) relative to the first sub-actuator housing (170) and to selectively release the second rotor (114) so that it is substantially free to rotate about the first sub-axis of rotation (103) relative to the first sub-actuator housing (170) within the range of rotary motion. The fourth rotor (214) and the fourth stator (234) may comprise an electromagnetic reluctance hold device configured to selectively restrain the fourth rotor (214) from rotating about the second sub-axis of rotation (203) relative to the second sub-actuator housing (270) within the range of rotary motion and to selectively release the fourth rotor (214) so that it is substantially free to rotate about the second sub-axis of rotation (203) relative to the first sub-actuator housing (270) within the range of rotary motion.

The first rotor (104) may comprise a first input rotor shaft (150), a first output rotor shaft (152) and a first gear train (151) between the first input rotor shaft (150) and the first output rotor shaft (152) and the third rotor (204) may comprise an third input rotor shaft (250), a third output rotor shaft (252) and a third gear train (251) between the third input rotor shaft (250) and the third output rotor shaft (252). The first gear train (151) and third gear train (251) may each comprise a multi-stage planetary gear. The second rotor (114) may comprise a second input rotor shaft (160), a second output rotor shaft (162) and a second gear train (161) between the second input rotor shaft (160) and the second output rotor shaft (162) and the fourth rotor (214) may comprises an fourth input rotor shaft (260), a fourth output rotor shaft (262) and a fourth gear train (261) between the fourth input rotor shaft (260) and the fourth output rotor shaft (262).

The first member (105) and the first rotor (104) may be portions of a first specially formed solid unitary element and the second member (115) and the second rotor (114) may be portions of a second specially formed solid unitary element. Each of the first member (105), second member (115), third member (205) and fourth member (215) may comprise a clevis-type end with a clevis type pin (105A, 115A, 205A and 215A) oriented about the respective first member pivot axis (106), the second member pivot axis (116), the third member pivot axis (206) and the fourth member pivot axis (216), and each of the respective first linkage (107), second linkage (117), third linkage (207) and fourth linkage (217) may comprise a corresponding opening orientated about the respective first member pivot axis (106), the second member pivot axis (116), the third member pivot axis (206) and the fourth member pivot axis (216) configured to receive the respective clevis pin, and the respective first member (105), second member (115), third member (205) and fourth member (215) may be pivotally connected to the respective first linkage (107), second linkage (117), third linkage (207) and fourth linkage (217) via the respective pin joint connections. The output member (10) may comprise a center hub having a first connection arm (41), a second connection arm (42), a third connection arm (43) and a fourth connection arm (44), and each of the first connection arm (41), second connection arm (42), third connection arm (43) and fourth connection arm (44) may comprise a clevis-type end with a clevis type pin (41A, 42A, 43A, 44A) oriented about the respective first output pivot axis (100), the second output pivot axis (101), the third output pivot axis (200) and the fourth output pivot axis (201), and each of the respective first linkage (107), second linkage (117), third linkage (207) and fourth linkage (217) may comprise a corresponding opening (107A, 117A, 207A, 217A) orientated about the respective first output pivot axis (100), the second output pivot axis (101), the third output pivot axis (200) and the fourth output pivot axis (201) configured to receive the respective clevis pins, and the respective first linkage (107), second linkage (117), third linkage (207) and fourth linkage (217) may be pivotally connected to the respective first connection arm (41), second connection arm (42), third connection arm (43) and fourth connection arm (44) of the output member (10) via the respective pin joint connections. Each of the first linkage (107), second linkage (117), third linkage (207) and fourth linkage (217) may comprise a single bar linkage.

The output member (10) may comprise a cylindrical hollow shaft and the structure (12) may comprise a center collar (70A, 70B) having an opening orientated about the output axis (11) and configured to receive the shaft of the output member (10). The structure (12) may comprise a first strongback arm (71A, 71B) extending radially from the center collar (70A, 70B) and a second strongback arm (72A, 72B) extending radially from the center collar (70A, 70B). The first strongback arm (71A, 71B) may be configured to support the first sub-actuator (102) such that the first sub-actuator housing (170) of the first sub-actuator (102) is rotatable about the first sub-axis of rotation (103) relative to the first strongback arm (71A, 71B), and the second strongback arm (72A, 72B) may be configured to support the second sub-actuator (202) such that the second sub-actuator housing (270) of the second sub-actuator (202) is rotatable about the second sub-axis of rotation (203) relative to the second strongback arm (72A, 72B). The first strongback arm (71A, 71B) may comprise an opening orientated about the first sub-axis of rotation (103) configured to receive the first sub-actuator housing (170) of the first sub-actuator (102) and the second strongback arm (72A, 72B) may comprise an opening (76) orientated about the second sub-axis of rotation (203) configured to receive the second sub-actuator housing (270) of the second sub-actuator (202). The first strongback arm (71A, 71B) may be pivotally connected to the center collar (70A, 70B) and may further comprise a kick link (81, 82) connected to both the first strongback arm and the structure. The center collar (70A, 70B) may be fixed to a fuselage (9) of an aircraft. The center collar (470A), the first strongback arm (171A) and the second strongback arm (172A) may comprise a first solid unitary member (112A). The rotary actuator system may comprise a second center collar (470B), a third strongback arm (171B) and a fourth strongback arm (172B) comprising a second solid unitary member (112B) parallel to the first solid unitary member.

The failure may comprise a mechanical jam, an electrical motor failure or a loss of power. The first sub-axis of rotation (103), the second sub-axis of rotation (203) and the third sub-axis of rotation (303) may be circumferentially spaced about a circle having the rotary output axis (11) as a center axis. The second stator element and the second rotor may comprise a releasable brake.

DETAILED DESCRIPTION OF THE EMBODIMENTS

Figure 1:
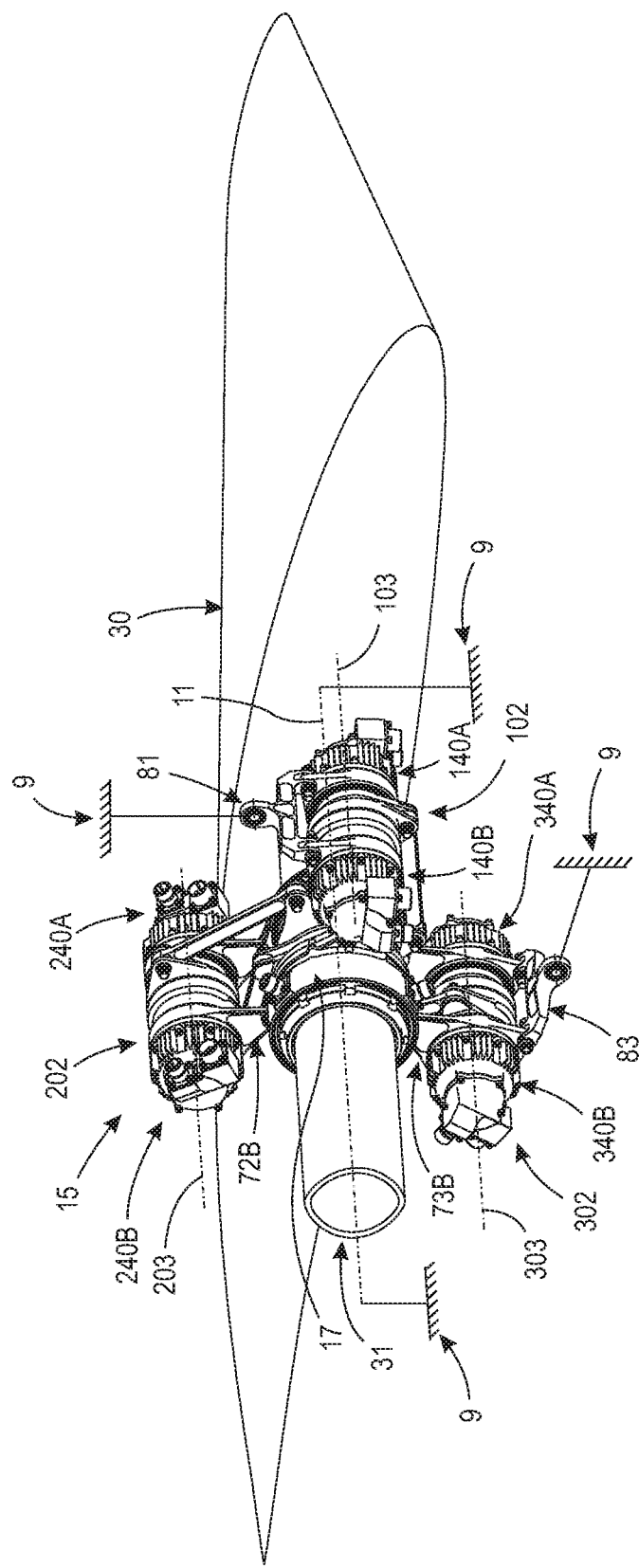
FIG. 1 is perspective view of a first embodiment of an improved actuator system.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
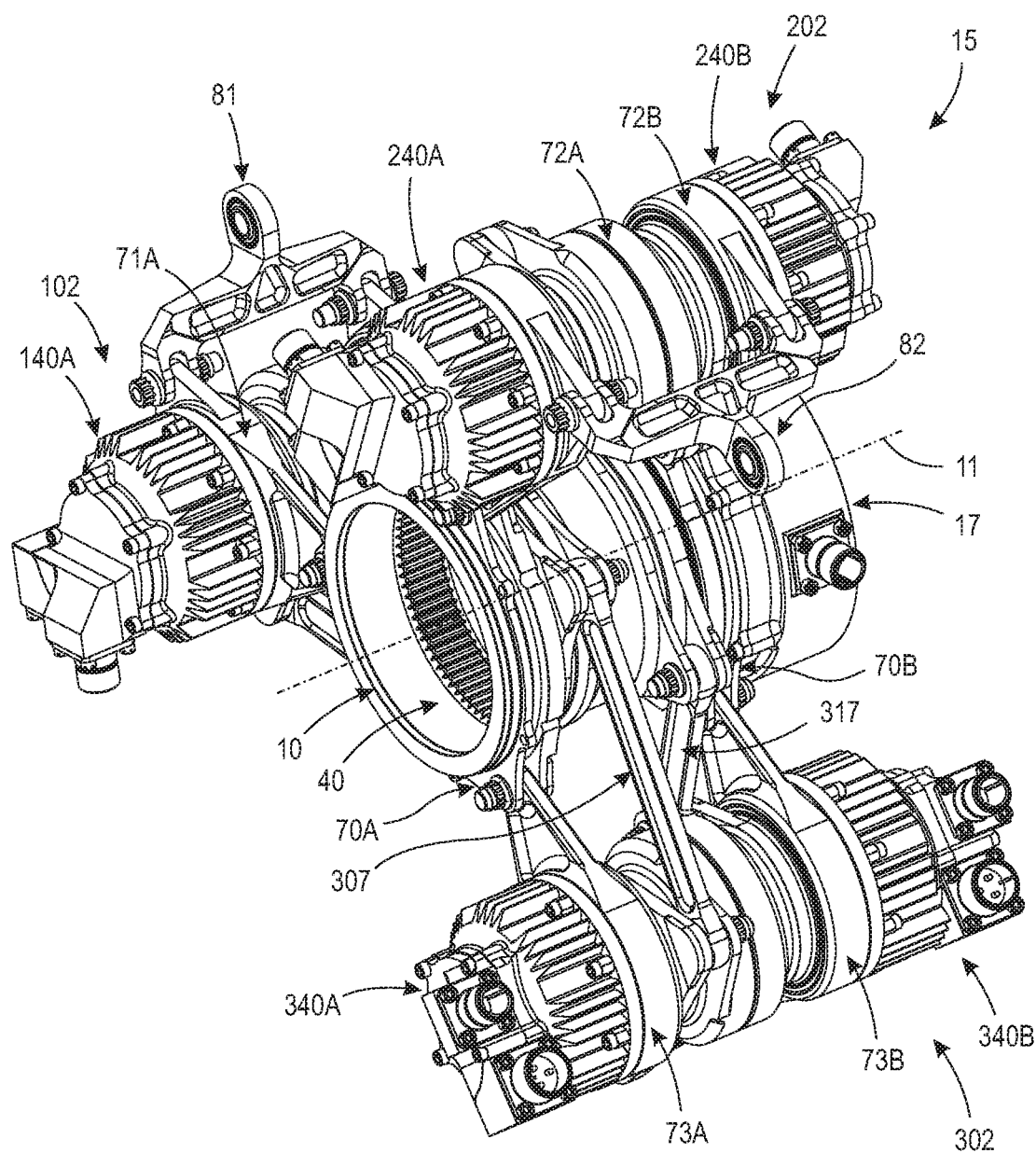
FIG. 2 is an enlarged partial rear perspective view of the actuator system shown in FIG. 1, with the driven object and output shaft not shown.
Figure 3:
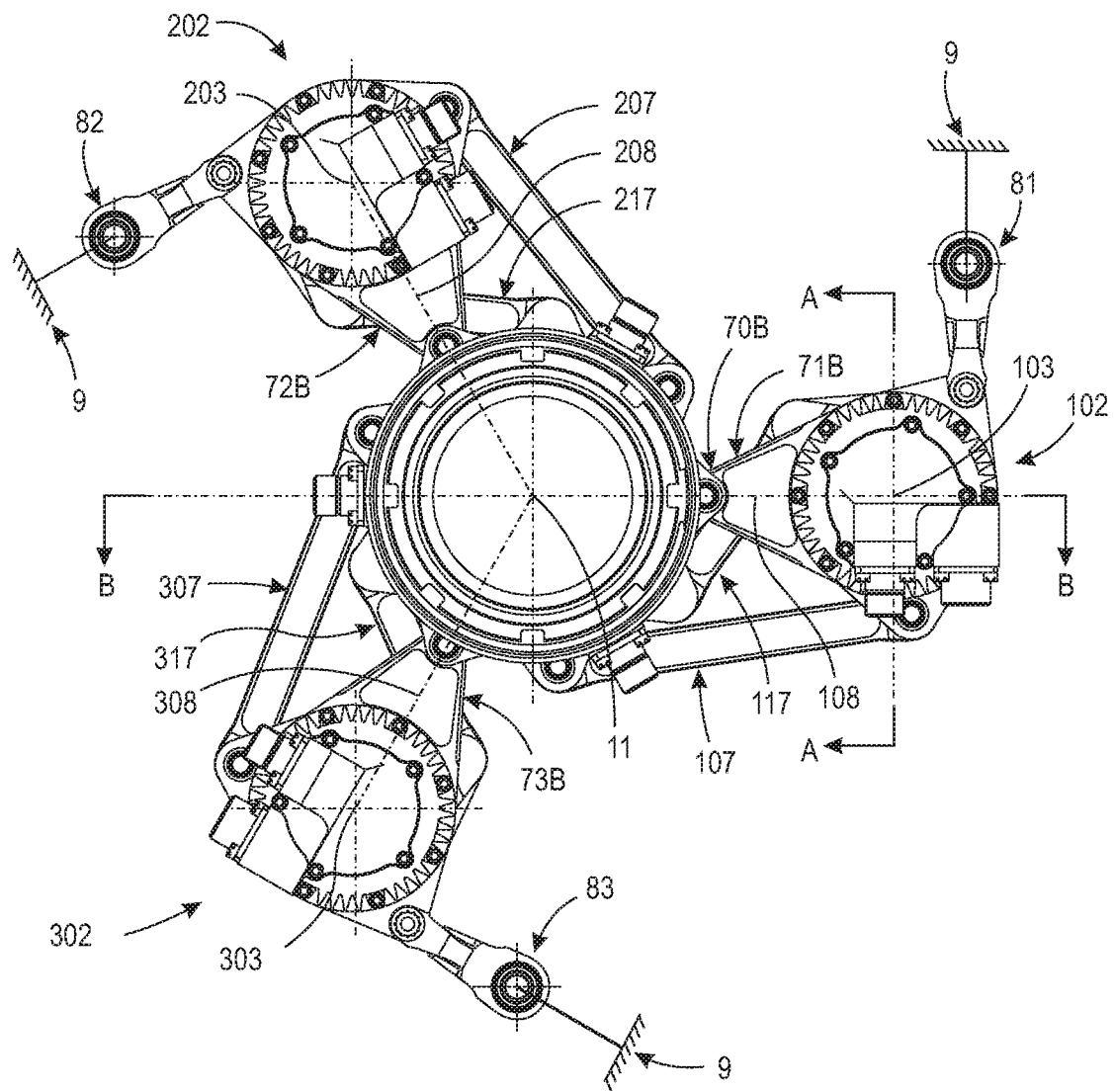
FIG. 3 is a front plan view of the actuator system shown in FIG. 2.
Figure 4:
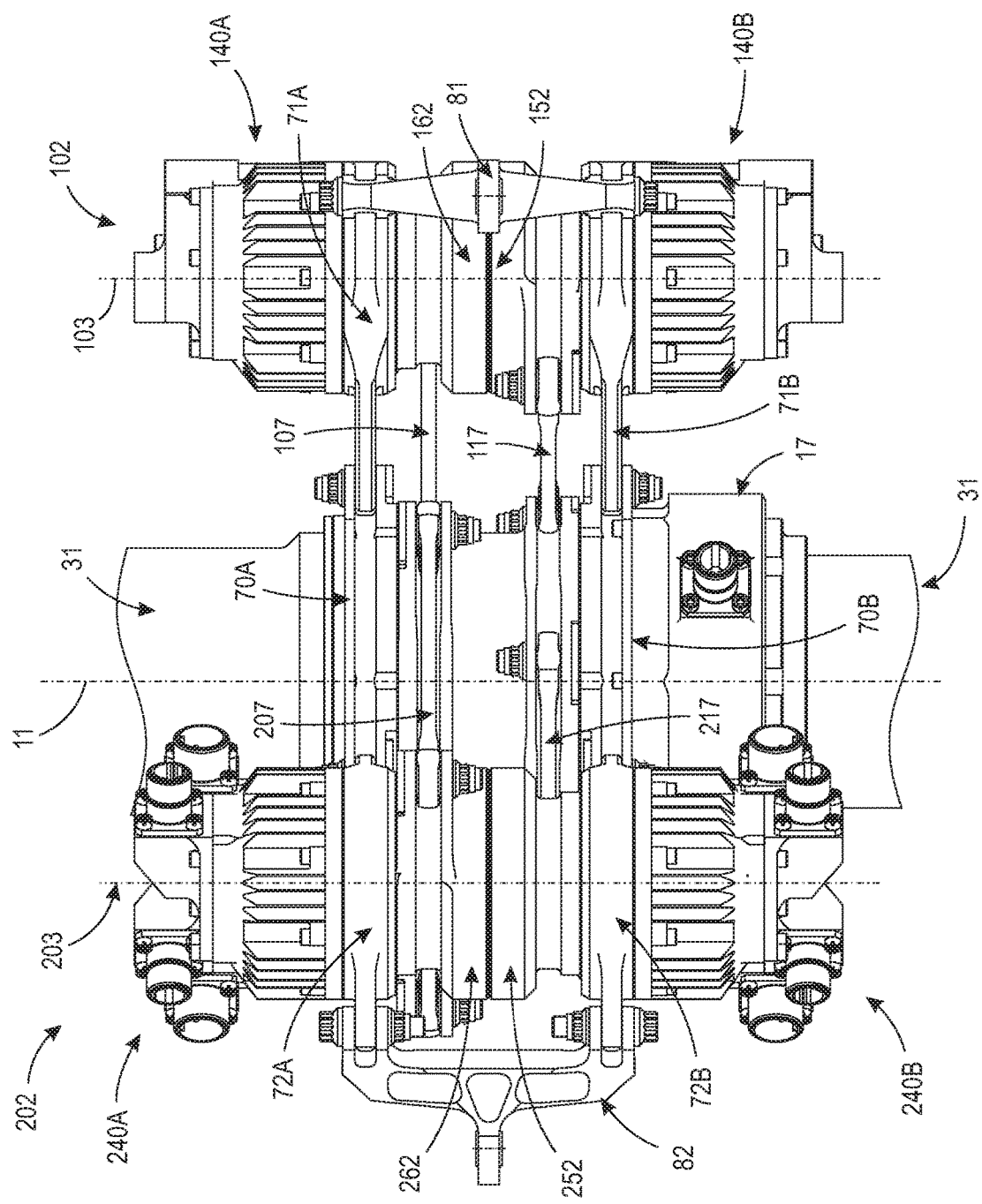
FIG. 4 is a top plan view of the actuator system shown in FIG. 1.

Referring now to the drawings, and more particularly to FIGS. 1 and 2 thereof, an improved actuator system is provided, a first embodiment of which is generally indicated at 15. As shown, system 15 generally includes rotating internally splined output hub 10 configured to impart a limited range of rotary motion via torque tube 31 to flight control surface 30 about rotary output axis 11 relative to aircraft frame 9, first actuator 102 having first axis of rotation 103 and linked to output hub 10, second actuator 202 having second axis of rotation 203 and linked to output hub 10, and third actuator 302 having third axis of rotation 303 and linked to output hub 10. First actuator 102, second actuator 202 and third actuator 302 are linked to output hub 10 by linkage system 13, which is shown in FIG. 6. First actuator 102, second actuator 202, third actuator 302 and output hub 10 are rotationally supported about their respective axes of rotation by support structure 12 shown in FIG. 5.

As shown, actuator axis of rotation 103, actuator axis of rotation 203, actuator axis of rotation 303 and output axis 11 are substantially parallel to each other. Actuator axis of rotation 103, actuator axis of rotation 203 and actuator axis of rotation 303 are also orientated equal radial distances from output axis 11 and are equally spaced circumferentially about axis 11. Actuators 102, 202 and 302 drive output hub 10 about axis 11 through a range of motion. In this embodiment, such total range of motion about axis 11 is typically about 90 degrees.

Output hub 10 includes splined bore 40 for receiving and rotationally engaging correspondingly splined shaft 31. Shaft 31 is a spline shaft configured to engage the inner facing splines of output hub 10. However, other mechanical means for transmitting rotation from output hub 10 may also be used, including without limitation as described below. In this embodiment, shaft 31 is free to rotate about axis 11 relative to aircraft frame 9, but is otherwise connected to aircraft frame 9 such that it may only rotate about axis 11. In this manner, shaft 31 supports actuator system on aircraft frame 9.

Figure 5:
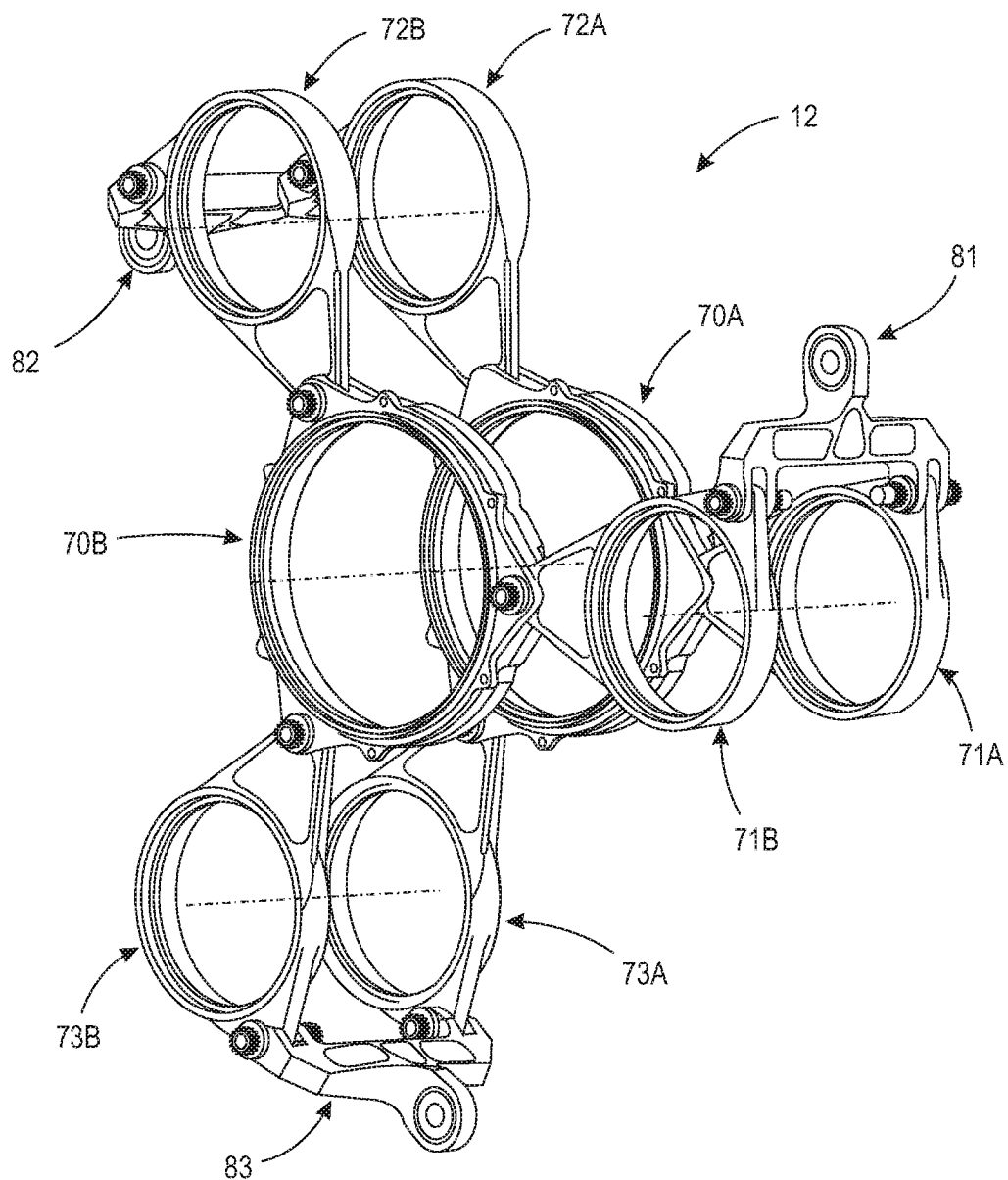
FIG. 5 is a partial perspective view of the stationary actuator support structure shown in FIG. 1.
Figure 6:
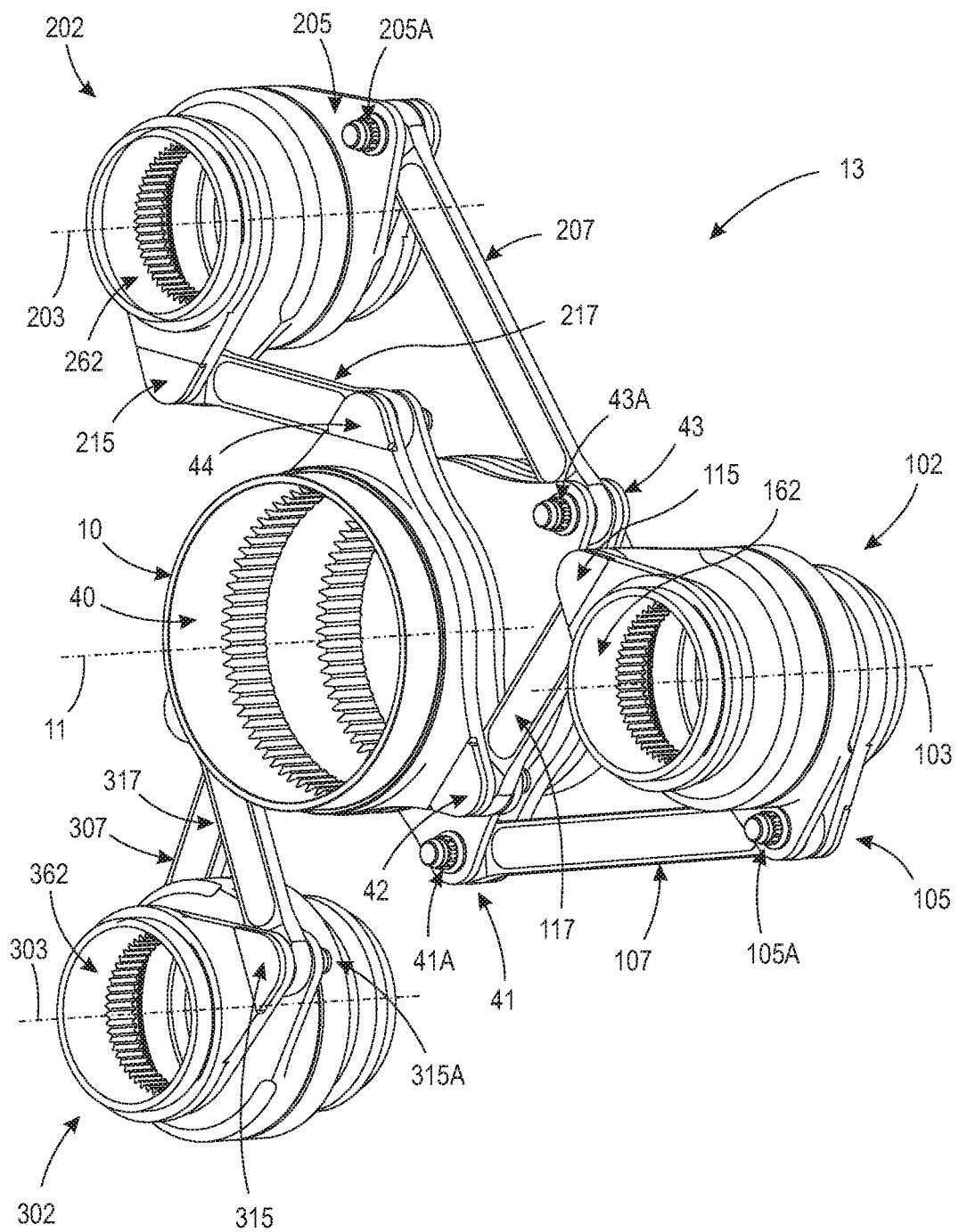
FIG. 6 is a partial perspective view of the rotating actuator linkage system shown in FIG. 2, with the output rotor ring of the motors shown.

As shown in FIG. 5, output hub 10 and actuators 102, 202 and 302 are also supported for rotational movement about their relative axes of rotation by non-rotating rigid structure 12 grounded to aircraft frame 9. Structure 12 includes stationary center collars 70A and 70B, strongback arms 71A, 71B, 72A, 72B, 73A and 73B, and kick links 81, 82 and 83. Strongback arms 71A, 72A and 73A are bolted to and extend radially from center collar 70A, and strongback arms 71B, 72B and 73B are bolted to and extend radially from center collar 70B. Center collars 70A and 70B rotationally support output hub 10 via bearings such that output hub 10 may rotate about output axis 11 relative to structure 12 and airframe 9. As shown, strongback arms 71A, 72A and 73A are bolted at an inner connection to the outer circumference of center collar 70A, which are in turn is grounded to aircraft frame 9. As shown, strongback arms 71B, 72B and 73B are bolted at an inner connection to the outer circumference of center collar 70B, which is in turn grounded to aircraft frame 9. Strongback arms 71A, 71B, 72A, 72B, 73A and 73B each comprise an outer collar configured to support, via bearings, actuators 102, 202 and 302 such that actuators 102, 202 and 302 may rotate relative to structure 12. Thus, with reference to FIGS. 1 and 5, collars 71A and 71B support motors 140A and 140B of actuator 102, collars 72A and 72B support motors 240A and 240B of actuator 202, and collars 73A and 73B support motors 340A and 340B of actuator 302. Each pair of collars of strongback arms 71A and 71B, 72A and 72B, and 73A and 73B are bolted at their outer circumferences to kick links 81, 82 and 83, respectively. Kick links 81, 82 and 83 are in turned bolted to aircraft frame 9. Accordingly, center collars 70A and 70B hold output hub 10 in rotary engagement for rotation relative to reference structure 12 and airframe 9 about axis 11. Similarly, collars 71A and 71B, 72A and 72B, and 73A and 73B hold motors 140A and 140B, 240A and 240B, and 340A and 340B in rotary engagement for rotation relative to reference structure 12 and airframe 9 about axis 103, 203 and 303 respectively. Axes 11, 103, 203 and 303 are generally parallel to each other and separated by a fixed distance. Reference structure 12 includes multiple bearings severally indicated at 14, to provide such rotational engagement.

Figure 14:
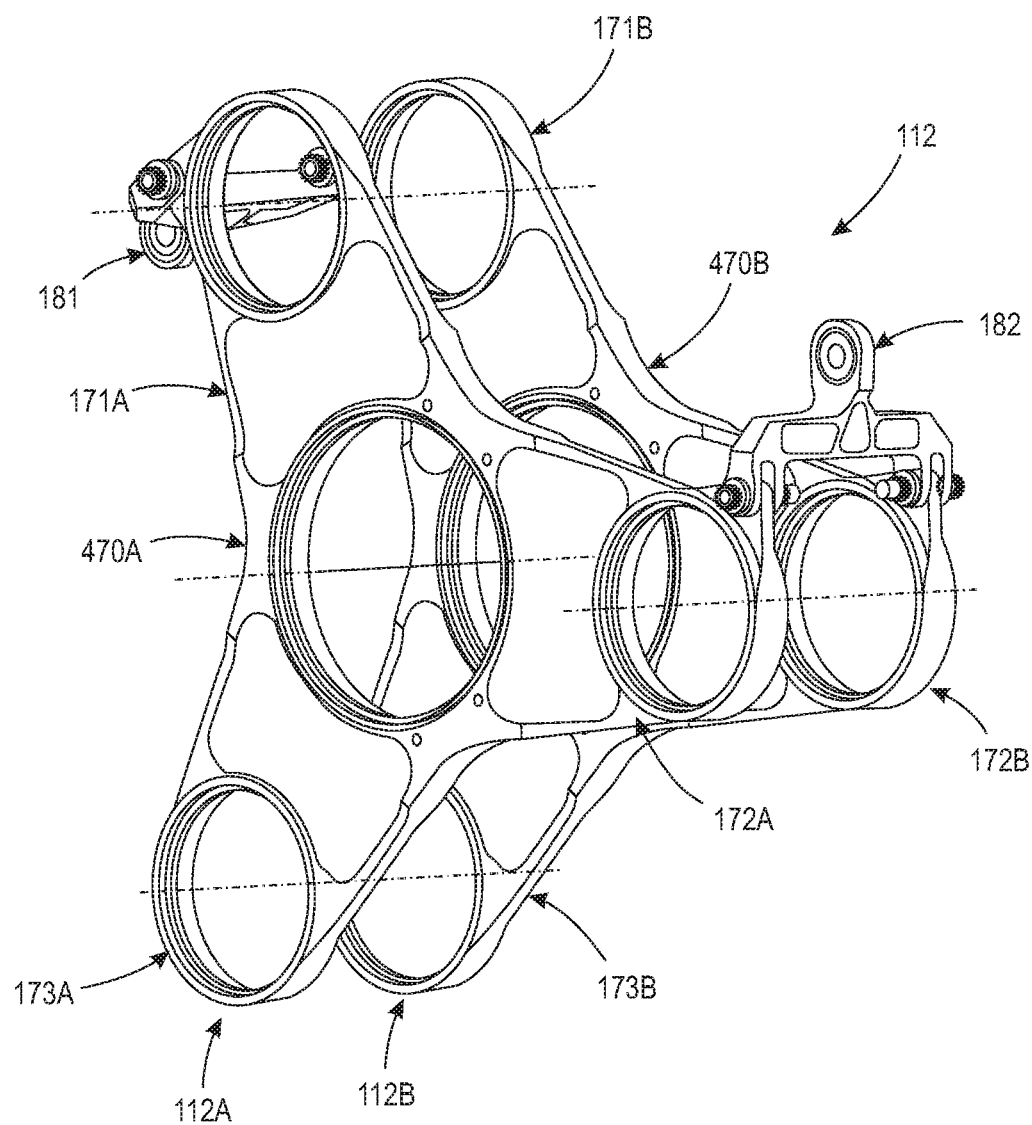
FIG. 14 is a perspective view of a second embodiment of the stationary actuator support structure shown in FIG. 2.

Because center collars 70A and 70B are bolted to strongback arms 71A, 71B, 72A, 72B, 73A and 73B, and strongback arms 71A, 71B, 72A, 72B, 73A and 73B are bolted to kick links 81, 82 and 83, and kick links 81, 82 and 83 are bolted to airframe 9, the bolts holding the elements may be untightened and removed to allow any of actuators 102, 202 and 302 to be removed and services or replaced as needed. Thus, with structure 12, actuator system 15 comprises a three line replaceable unit. An alternative non-rotating rigid structure 112 grounded to aircraft frame 9 for supporting output hub 10 and actuators 102, 202 and 302 is shown in FIG. 14. Rather than having dual collars 70A and 70B bolted to strongback arms 71A, 71B, 72A, 72B, 73A and 73B, in structure 112 shown in FIG. 14, center collar 170A and strongback arms 171A, 172A and 173A are formed as a solid unitary element 112A, and collar 170B and strongback arms 171B, 172B and 173B are formed as a solid unitary element 112B. Units 112A and 112B are rigidly connected to airframe 9 via kick links 181 and 182. This provides a single line replaceable unit.

First actuator 102 comprises rotary hold motor 140A and rotary drive motor 140B in housing 170. Rotary motors 140A and 140B are mounted with their drive shafts coaxial and aligned about axis 103.

Figure 8:
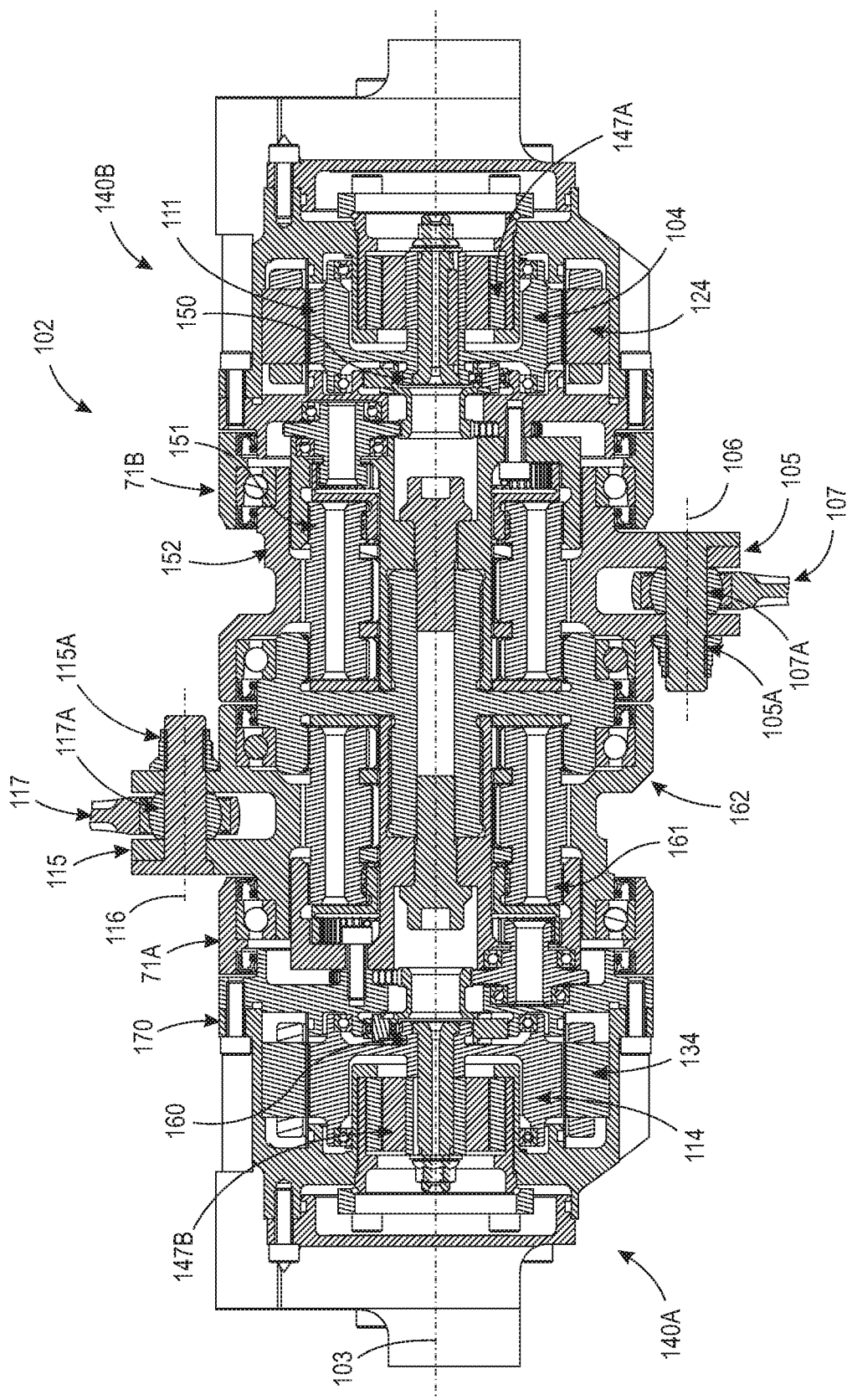
FIG. 8 is longitudinal cross-sectional view of the first actuator subassembly shown in FIG. 1.
Figure 9:
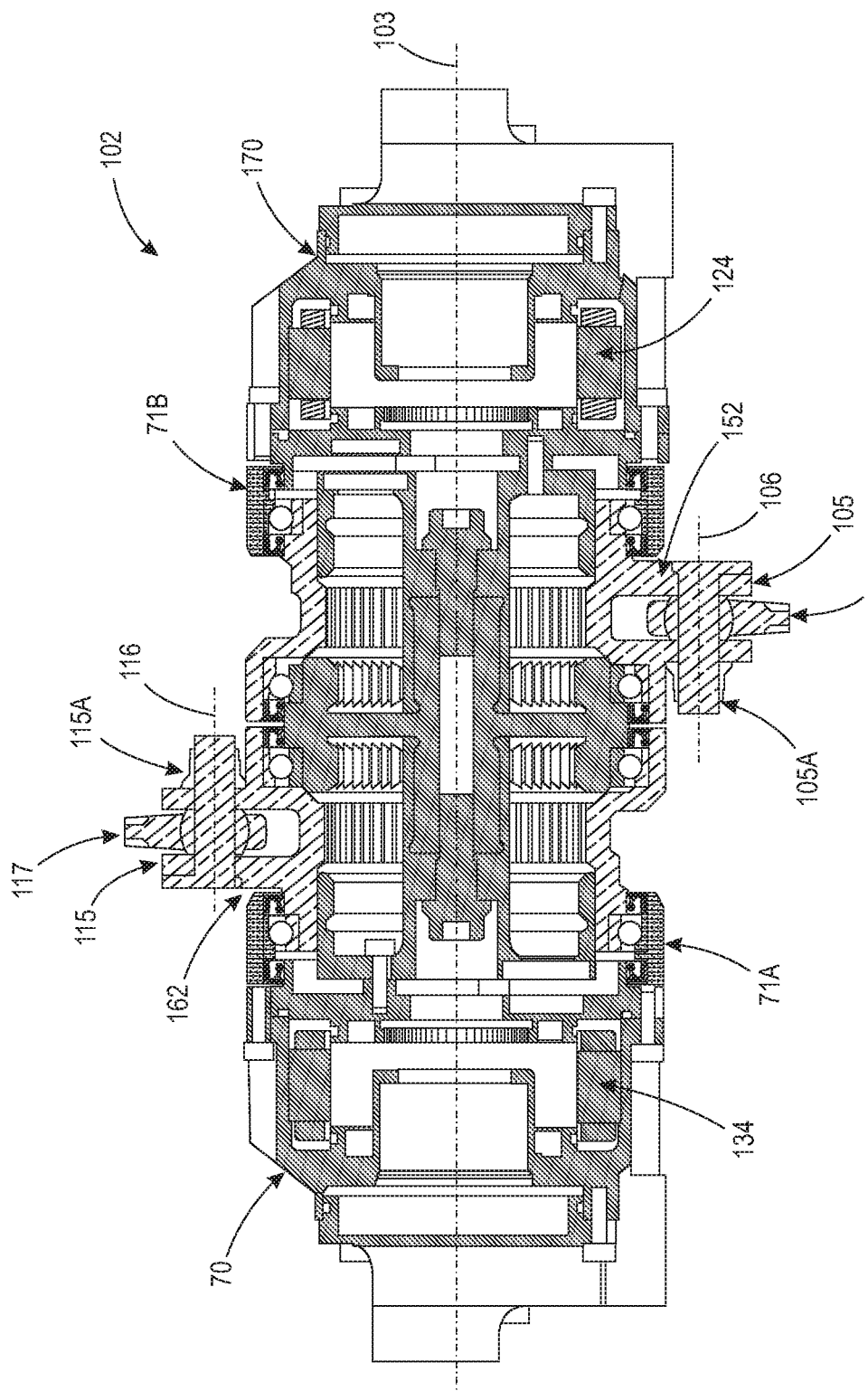
FIG. 9 is a partial longitudinal cross-sectional view of the first actuator subassembly shown in FIG. 1, showing just the housing and rotor end connections.

As shown in FIGS. 8 and 9, in this embodiment rotary drive motor 140B is a brushless DC permanent magnet electrical motor with planetary gear reduction unit 151. Rotary motor 140B includes stator 124 and multiple component rotor 104. Rotor 104 is configured to selectively rotate about axis of rotation 103 relative to stator 124 and housing 170. Rotor 104 includes external magnets 111 facing stator 124, inner rotor gear input shaft 150, outer rotor gear output ring or shaft 152, and multi-stage compound planetary gear train 151 between input gear shaft 150 and output gear shaft 152 of rotor 104. However, other rotary motors or actuators, such as stepper motors, rotary hydraulic actuators or the like, may be used as alternatives. Also, other gear trains may be used to provide a mechanical advantage to the torque produced by motor 140B or no gears may be used as alternatives.

Stator 124 is fixed to housing 170 via an interference fit and optionally also glued to housing 170. It should be noted that neither housing 170 and stator 124, nor rotor 104 are stationary relative to reference structure 9. Housing 170 and stator 124 are not rigidly mounted to reference structure 9. Housing 170 with stator 124 are able to rotate relative to reference structure 12 and 9 about axis 103 independent of the rotation of rotor 104 relative to reference structure 12 and 9.

FIG. 9 shows housing 170 and stators 124 and 134 of actuator 102 with common uniform cross hatching. Such elements are connected such that they always rotate together about axis 103. Rotor output elements 152 and 162, pivotally connected to linkages 107 and 117 of linkage system 113, are shown with a second cross hatching. Such elements are connected such that they always rotate about axis 103 with rotation of center output hub 10 about axis 11. If hold motor 140A is released, as described below, such elements may also rotate about axis 103 independently of housing 170 and stators 124 and 134. Finally, strong arms 71A and 71B connected to reference support structure 12 are shown with a third hatching. Such elements do not rotate about axis 11 or axis 103. Housing 170 and stators 124 and 134 may rotate about axis 103 relative to strong arms 71A and 71B. Housing 270 and 370 of actuators 202 and 203 share this configuration.

Figure 7:
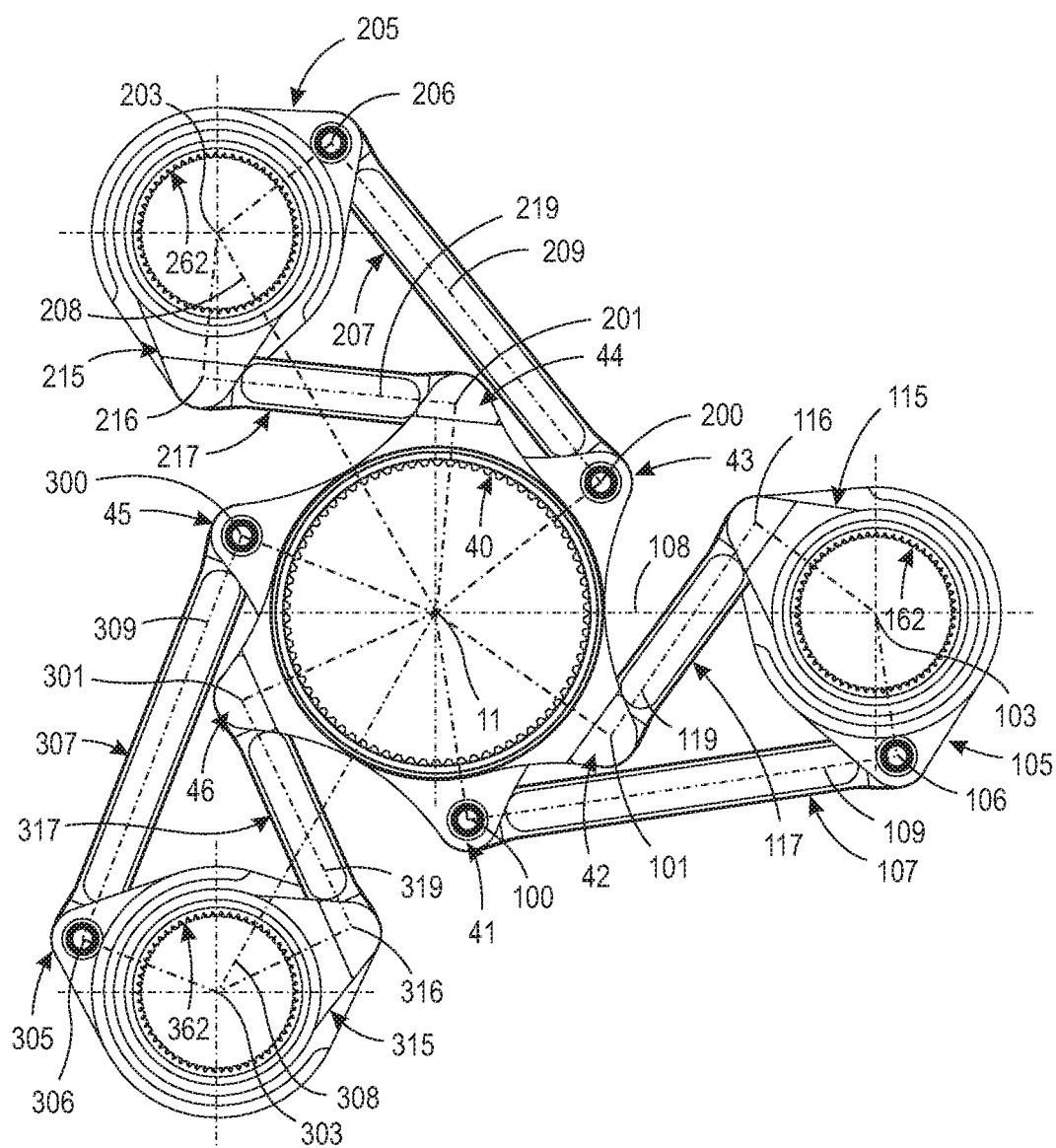
FIG. 7 is a front plan view of the actuator linkage system shown in FIG. 6.

As shown in FIGS. 6-8, output rotor shaft 152 of rotor 104 includes or is rigidly coupled to rotor arm 105, which in turn is connected at pivot axis 106 to a first end of linkage 107. In this embodiment, output rotor shaft 152 and rotor arm 105 are portions of a specially formed solid unitary element. However, as an alternative and without limitation, such elements may be separate pieces fixed to each other or otherwise connected.

As shown, rotor arm 105 has a clevis-type end with clevis type pin 105A oriented about pivot axis 106. Linkage 107 comprise a corresponding opening 107A orientated about pivot axis 106 that is configured to receive clevis pin 105A, such that rotor arm 105 is pivotally connected to linkage 107 by the pin joint connection. The pivot connection between rotor arm 105 and linkage 107 at pivot axis 106 is offset a distance from axis of rotation 103.

The other end of linkage 107 is in turn connected at pivot axis 100 to output hub 10. As shown, output hub 10 includes connection arm 41 having a clevis-type end with clevis type pin 41A oriented about pivot axis 100. Linkage 107 comprise a corresponding opening 107B orientated about pivot axis 100 configured to receive clevis pin 41A such that linkage 107 is pivotally connected to connection arm 41 via the pin joint connection. The pivot connection between output hub 10 and linkage 107 at pivot axis 100 is offset a distance from output axis 11.

In this embodiment, rotary hold motor 140A is a single phase electromagnetic reluctance hold device configured to selectively restrain rotor 114 from rotating about axis 103 relative to housing 170 within the range of rotary motion when energized or to selectively release rotor 114 so that it is substantially free to rotate about axis of rotation 103 relative to housing 170 within the range of rotary motion when not energized. As show in FIGS. 8 and 9, rotary hold motor 140A includes stator 134 and rotor 114. Rotor 114 is iron based and includes outer shaft 162, inner shaft 160, and multi-stage compound planetary gear train 161 between shaft 162 and shaft 160. Other hold devices, such as a brake, a magnetic clutch, a toroid motor, or the like, may be used as alternatives. Also, other gear trains may be used to provide a mechanical advantage to the holding torque provided by motor 140A, or no gears may be used as alternatives.

Stator 134 is fixed to housing 170 via an interference fit and optionally also glued to housing 170. When the windings of motor 140A are energized such that rotor 114 and rotor output shaft 162 are rotationally locked to stator 134 and housing 170, housing 170 will rotate with any rotation of rotor shaft 162 about axis 103. When motor 140A is released, housing 170 with stator 134 are able to rotate relative to reference structure 9 about axis 103 independent of the rotation of rotor 114 relative to reference structure 9.

As shown in FIGS. 6-9, rotor shaft 162 of rotor 114 is rigidly coupled to rotor arm 115, which in turn is connected at pivot axis 116 to a first end of linkage 117. In this embodiment, output rotor shaft 162 and rotor arm 115 are portions of a specially formed solid unitary element. However, as an alternative and without limitation, such elements may be separate pieces fixed to each other or otherwise connected.

As shown, rotor arm 115 has a clevis-type end with clevis type pin 115A oriented about pivot axis 116. Linkage 117 comprise a corresponding opening 117A orientated about pivot axis 116 that is configured to receive clevis pin 115A, such that rotor arm 115 is pivotally connected to linkage 117 by the pin joint connection. The pivot connection between rotor arm 115 and linkage 117 at pivot axis 116 is offset a distance from axis of rotation 103.

The other end of linkage 117 is in turn connected at pivot axis 101 to output hub 10. As shown, output hub 10 includes connection arm 42 having a clevis-type end with clevis type pin 42A oriented about pivot axis 101. Linkage 117 comprise a corresponding opening 117B orientated about pivot axis 101 configured to receive clevis pin 42A such that linkage 117 is pivotally connected to connection arm 42 via the pin joint connection. The pivot connection between output hub 10 and linkage 117 at pivot axis 101 is offset a distance from output axis 11. Thus, link 107 is pivotally connected between drive arm portion 105 of rotor 104 and drive arm portion 41 of output hub 10. Link 117 is pivotally connected between drive arm portion 115 of rotor 104 and drive arm portion 42 of output hub 10. However, such couplings may alternatively be a gear coupling, a belt coupling, or other similar couplings.

As shown in FIG. 7, an imaginary line extending between output axis 11 and axis of rotation 103 defines drive axis 108. An imaginary line extending between pivot axis 100 and pivot axis 106 defines linkage axis 109. As shown, the connections between output hub 10, linkage 107 and rotor arm 105 are positioned such that first linkage axis 109 does not intersect first drive axis 108 with rotation of output hub 10 about output axis 11 within the range of rotary motion of actuator system 15. An imaginary line extending between pivot axis 101 and pivot axis 116 defines second linkage axis 119. As shown, the connections between output hub 10, linkage 117 and rotor arm 115 are positioned such that second linkage axis 119 intersects first drive axis 108 with rotation of output hub 10 about output axis 11 within the range of rotary motion of actuator system 15.

With drive motor 140B paired with holding device 140A in housing 170 and with linkage system 13, under normal operation, holding device 140A locks the rotational position between housing 170 and rotor shaft 162 and rotor arm 115. In this configuration, a torque produced by motor 140B and rotor 104 is transferred through linkage 107 and first linkage axis 109 and linkage 117 and second linkage axis 119 and thereby summed at output axis 11 when rotor 114 is restrained from rotating relative to housing 170 within the range of rotary motion of the system. If drive actuator 140B jams or fails, then hold motor 140A releases the lock between stator 134 and rotor 114, and therefore releases housing 170 and rotor shaft 162 and rotor arm 115 so that rotor 114 is substantially free to rotate about axis of rotation 103 relative to housing 170 and such that first linkage 107 and linkage axis 109 and second linkage 117 and linkage axis 119 are substantially free to move with rotation of output hub 10 about output axis 11 relative to structure 9 within its range of rotary motion, which effectively releases any effect motor 140B has on output hub 10. This allows output hub 10 to be driven by actuator 202 and/or actuator 302. Thus, drive motor 140B and hold motor 140A may be controlled so as to go into a bypass mode and rotate freely under the power of the other actuators 202 and/or 302 in system 15. If drive motor 140B fails, actuator 102 operatively drops out of actuator system 15.

Second actuator 202 comprises rotary hold motor 240A and rotary drive motor 240B in housing 270. Rotary motors 240A and 240B are mounted with their drive shafts coaxial and aligned about axis 203.

Figure 10:
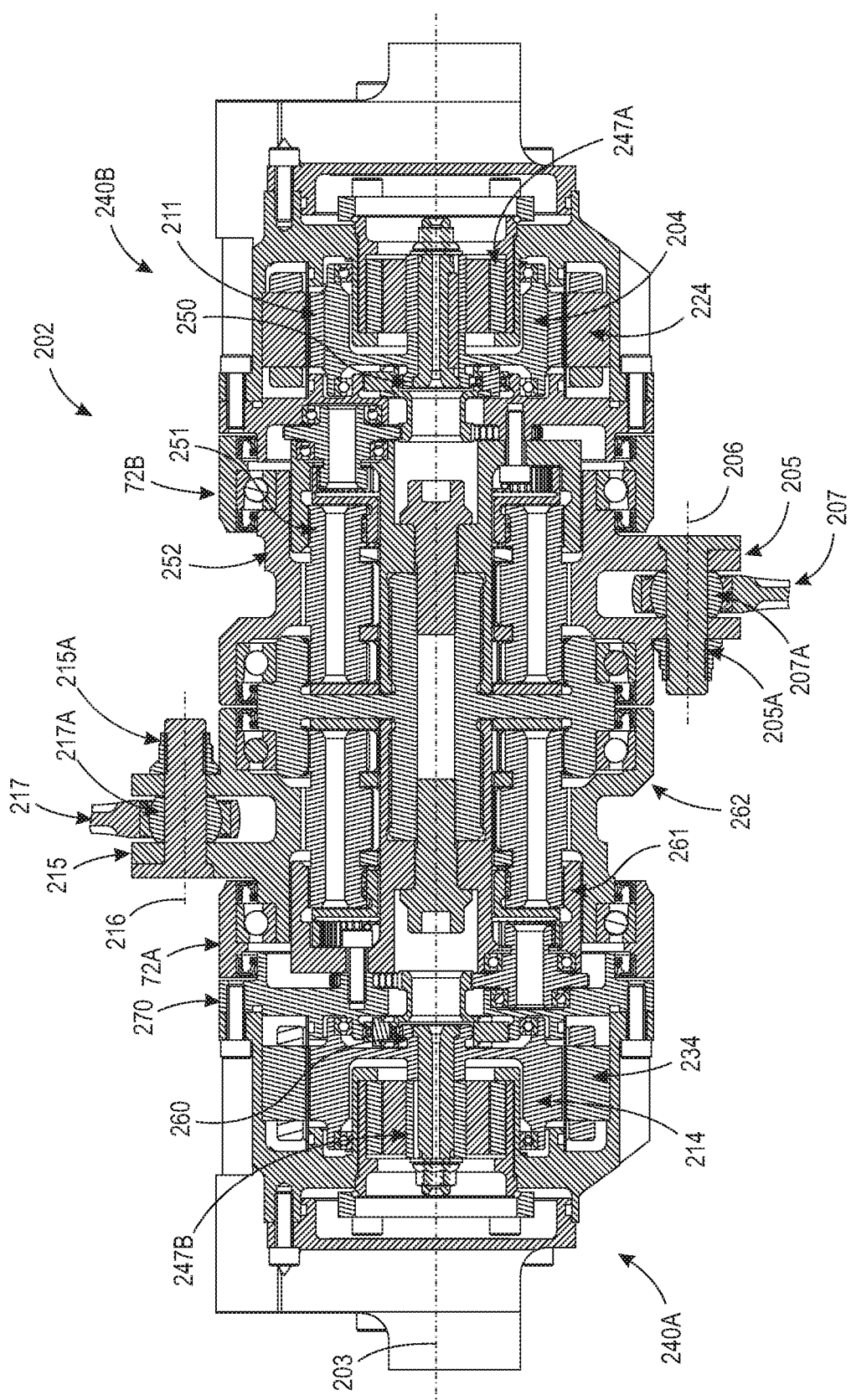
FIG. 10 is longitudinal cross-sectional view of the second actuator subassembly shown in FIG. 1.

As shown in FIG. 10, in this embodiment rotary drive motor 240B is a brushless DC permanent magnet electrical motor with planetary gear reduction unit 251. As shown in FIG. 10, rotary motor 240B includes stator 224 and rotor 204. Rotor 204 is configured to selectively rotate about axis of rotation 203 relative to stator 224 and housing 270. Rotor 204 includes external magnets 211 facing stator 224, inner rotor gear input shaft 250, outer rotor gear output ring or shaft 252, and multi-stage compound planetary gear train 251 between input gear shaft 250 and output gear shaft 252 of rotor 204. However, other rotary motors or actuators, such as stepper motors, rotary hydraulic actuators or the like, may be used as alternatives. Also, other gear trains may be used to provide a mechanical advantage to the torque produced by motor 240B or no gears may be used as alternatives.

Stator 224 is fixed to housing 270 via an interference fit and optionally also glued to housing 270. It should be noted that neither housing 270 and stator 224 nor rotor 204 are stationary relative to reference structure 9. Housing 270 and stator 224 are not rigidly mounted to reference structure 9. Housing 270 with stator 224 are able to rotate relative to reference structure 9 about axis 203 independent of the rotation of rotor 204 relative to reference structure 9.

As shown in FIGS. 6, 7 and 10, output rotor shaft 252 of rotor 204 includes or is rigidly coupled to rotor arm 205, which in turn is connected at pivot axis 206 to a first end of linkage 207. In this embodiment, output rotor shaft 252 and rotor arm 205 are portions of a specially formed solid unitary element. However, as an alternative and without limitation, such elements may be separate pieces fixed to each other or otherwise connected.

As shown, rotor arm 205 has a clevis-type end with clevis type pin 205A oriented about pivot axis 206. Linkage 207 comprise a corresponding opening 207A orientated about pivot axis 206 that is configured to receive clevis pin 205A, such that rotor arm 205 is pivotally connected to linkage 207 by the pin joint connection. The pivot connection between rotor arm 205 and linkage 207 at pivot axis 206 is offset a distance from axis of rotation 203.

The other end of linkage 207 is in turn connected at pivot axis 200 to output hub 10. As shown, output hub 10 includes connection arm 43 having a clevis-type end with clevis type pin 43A oriented about pivot axis 200. Linkage 207 comprise a corresponding opening 207B orientated about pivot axis 200 configured to receive clevis pin 43A such that linkage 207 is pivotally connected to connection arm 43 via the pin joint connection. The pivot connection between output hub 10 and linkage 207 at pivot axis 200 is offset a distance from output axis 11.

In this embodiment, rotary hold motor 240A is a single phase electromagnetic reluctance hold device configured to selectively restrain rotor 214 from rotating about axis 203 relative to housing 270 within the range of rotary motion when energized or to selectively release rotor 214 so that it is substantially free to rotate about axis of rotation 203 relative to housing 270 within the range of rotary motion when not energized. As show in FIG. 10, rotary hold motor 240A includes stator 234 and rotor 214. Rotor 214 includes outer shaft 262, inner shaft 260, and multi-stage compound planetary gear train 261 between shaft 262 and shaft 260. Other hold devices, such as a brake, a magnetic clutch, a toroid motor, or the like, may be used as alternatives. Also, other gear trains may be used to provide a mechanical advantage to the holding torque provided by motor 240A or no gears may be used as alternatives.

Stator 234 is fixed to housing 270 via an interference fit and optionally also glued to housing 270. When motor 240A is energized such that rotor 214 and rotor output shaft 262 are rotationally locked to stator 234 and housing 270, housing 270 will rotate with any rotation of rotor shaft 262 about axis 203. When motor 240A is released, housing 270 with stator 234 are able to rotate relative to reference structure 9 about axis 203 independent of the rotation of rotor 214 relative to reference structure 9.

As shown in FIGS. 6, 7 and 10, rotor shaft 262 of rotor 214 is rigidly coupled to rotor arm 215, which in turn is connected at pivot axis 216 to a first end of linkage 217. In this embodiment, output rotor shaft 262 and rotor arm 215 are portions of a specially formed solid unitary element. However, as an alternative and without limitation, such elements may be separate pieces fixed to each other or otherwise connected.

As shown, rotor arm 215 has a clevis-type end with clevis type pin 215A oriented about pivot axis 216. Linkage 217 comprise a corresponding opening 217A orientated about pivot axis 216 that is configured to receive clevis pin 215A, such that rotor arm 215 is pivotally connected to linkage 217 by the pin joint connection. The pivot connection between rotor arm 215 and linkage 217 at pivot axis 216 is offset a distance from axis of rotation 203.

The other end of linkage 217 is in turn connected at pivot axis 201 to output hub 10. As shown, output hub 10 includes connection arm 44 having a clevis-type end with clevis type pin 44A oriented about pivot axis 201. Linkage 217 comprise a corresponding opening 217B orientated about pivot axis 201 configured to receive clevis pin 44A such that linkage 217 is pivotally connected to connection arm 44 via the pin joint connection. The pivot connection between output hub 10 and linkage 217 at pivot axis 201 is offset a distance from output axis 11. Thus, link 207 is pivotally connected between drive arm portion 205 of rotor 204 and drive arm portion 43 of output hub 10. Link 217 is pivotally connected between drive arm portion 215 of rotor 204 and drive arm portion 44 of output hub 10. However, such couplings may alternatively be a gear coupling, a belt coupling, or other similar couplings.

As shown in FIG. 7, an imaginary line extending between output axis 11 and axis of rotation 203 defines drive axis 208. An imaginary line extending between pivot axis 200 and pivot axis 206 defines linkage axis 209. As shown, the connections between output hub 10, linkage 207 and rotor arm 205 are positioned such that first linkage axis 209 does not intersect first drive axis 208 with rotation of output hub 10 about output axis 11 within the range of rotary motion of actuator system 15. An imaginary line extending between pivot axis 201 and pivot axis 216 defines second linkage axis 219. As shown, the connections between output hub 10, linkage 217 and rotor arm 215 are positioned such that second linkage axis 219 intersects first drive axis 208 with rotation of output hub 10 about output axis 11 within the range of rotary motion of actuator system 15.

With drive motor 240B paired with holding device 240A in housing 270 and with linkage system 13, under normal operation, holding device 240A locks the rotational position between housing 270 and rotor shaft 262 and rotor arm 215. In this configuration, a torque produced by motor 240B and rotor 204 is transferred through linkage 207 and first linkage axis 209 and linkage 217 and second linkage axis 219 and thereby summed at output axis 11 when rotor 214 is restrained from rotating relative to housing 270 within the range of rotary motion of the system. If drive actuator 240B jams or fails, then hold motor 240A releases the lock between stator 234 and rotor 214, and therefore releases housing 270 and rotor shaft 262 and rotor arm 215 so that rotor 214 is substantially free to rotate about axis of rotation 203 relative to housing 270 and such that first linkage 207 and linkage axis 209 and second linkage 217 and linkage axis 219 are substantially free to move with rotation of output hub 10 about output axis 11 relative to structure 9 within its range of rotary motion, which effectively releases any effect motor 240B has on output hub 10. This allows output hub 10 to be driven by actuator 102 and/or actuator 302. Thus, drive motor 240B and hold motor 240A may be controlled so as to go into a bypass mode and rotate freely under the power of the other actuators 102 and/or 302 in system 15. If drive motor 240B fails, actuator 202 operatively drops out of actuator system 15.

Third actuator 302 comprises rotary hold motor 340A and rotary drive motor 340B in housing 370. Rotary motors 340A and 340B are mounted with their drive shafts coaxial and aligned about axis 303.

Figure 11:
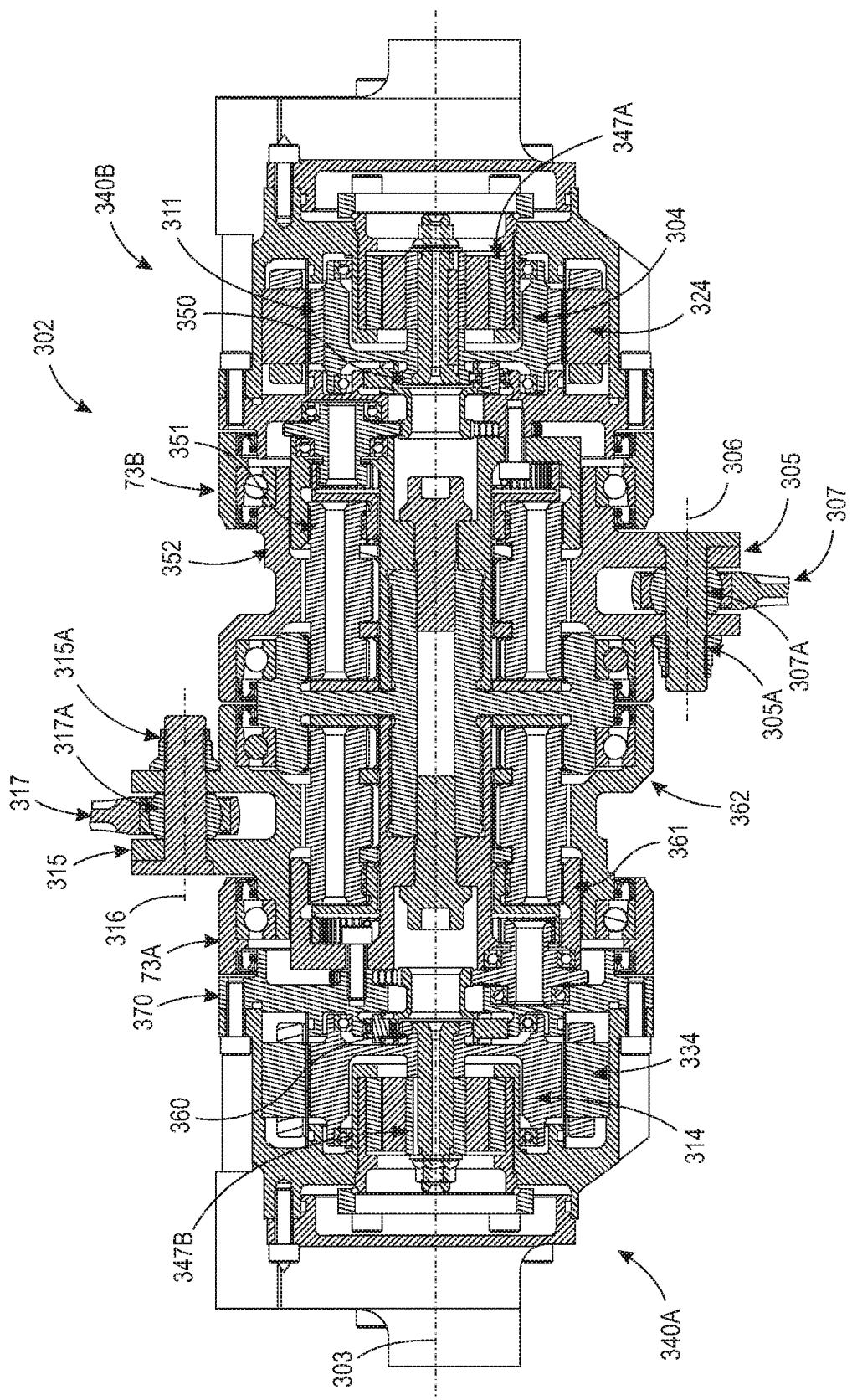
FIG. 11 is longitudinal cross-sectional view of the third actuator subassembly shown in FIG. 1.
Figure 12:
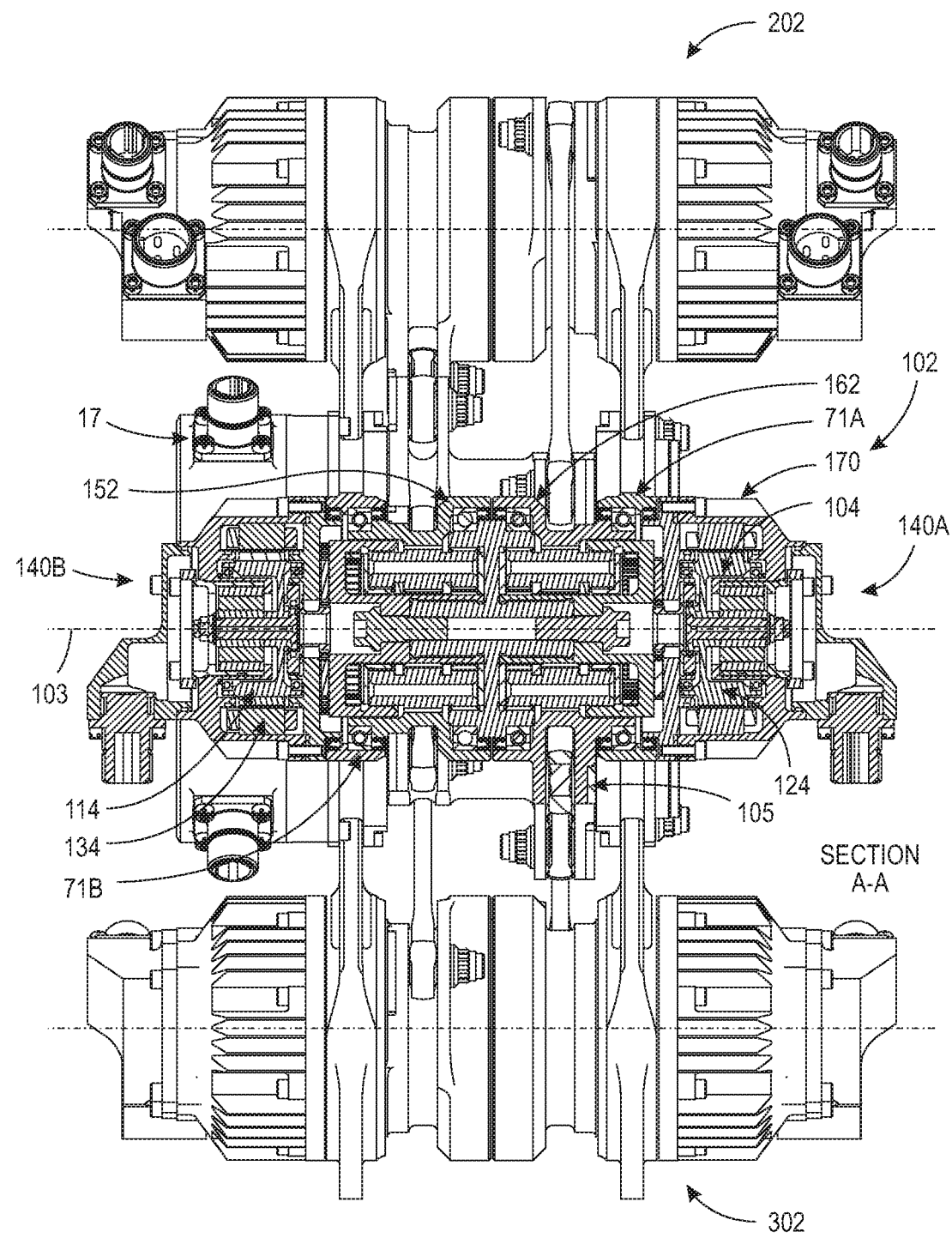
FIG. 12 is a longitudinal vertical cross-sectional view of the actuator system shown in FIG. 3, taken generally on line A-A of FIG. 3.

As shown in FIG. 11, in this embodiment rotary drive motor 340B is a brushless DC permanent magnet electrical motor with planetary gear reduction unit 351. As shown in FIG. 11, rotary motor 340B includes stator 324 and rotor 304. Rotor 304 is configured to selectively rotate about axis of rotation 303 relative to stator 324 and housing 370. Rotor 304 includes external magnets 311 facing stator 324, inner rotor gear input shaft 350, outer rotor gear output ring or shaft 352, and multi-stage compound planetary gear train 351 between input gear shaft 350 and output gear shaft 352 of rotor 304. However, other rotary motors or actuators, such as stepper motors, rotary hydraulic actuators or the like, may be used as alternatives. Also, other gear trains may be used to provide a mechanical advantage to the torque produced by motor 340B or no gears may be used as alternatives.

Stator 324 is fixed to housing 370 via an interference fit and optionally also glued to housing 370. It should be noted that neither housing 370 and stator 324 nor rotor 304 are stationary relative to reference structure 9. Housing 370 and stator 324 are not rigidly mounted to reference structure 9. Housing 370 with stator 324 are able to rotate relative to reference structure 9 about axis 303 independent of the rotation of rotor 304 relative to reference structure 9.

As shown in FIGS. 6, 7 and 11, output rotor shaft 352 of rotor 304 includes or is rigidly coupled to rotor arm 305, which in turn is connected at pivot axis 306 to a first end of linkage 307. In this embodiment, output rotor shaft 352 and rotor arm 305 are portions of a specially formed solid unitary element. However, as an alternative and without limitation, such elements may be separate pieces fixed to each other or otherwise connected.

As shown, rotor arm 305 has a clevis-type end with clevis type pin 305A oriented about pivot axis 306. Linkage 307 comprise a corresponding opening 307A orientated about pivot axis 306 that is configured to receive clevis pin 305A, such that rotor arm 305 is pivotally connected to linkage 307 by the pin joint connection. The pivot connection between rotor arm 305 and linkage 307 at pivot axis 306 is offset a distance from axis of rotation 303.

The other end of linkage 307 is in turn connected at pivot axis 300 to output hub 10. As shown, output hub 10 includes connection arm 45 having a clevis-type end with clevis type pin 45A oriented about pivot axis 300. Linkage 307 comprise a corresponding opening 307B orientated about pivot axis 300 configured to receive clevis pin 45A such that linkage 307 is pivotally connected to connection arm 45 via the pin joint connection. The pivot connection between output hub 10 and linkage 307 at pivot axis 300 is offset a distance from output axis 11.

In this embodiment, rotary hold motor 340A is a single phase electromagnetic reluctance hold device configured to selectively restrain rotor 314 from rotating about axis 303 relative to housing 370 within the range of rotary motion when energized or to selectively release rotor 314 so that it is substantially free to rotate about axis of rotation 303 relative to housing 370 within the range of rotary motion when not energized. As show in FIG. 11, rotary hold motor 340A includes stator 334 and rotor 314. Rotor 314 includes outer shaft 362, inner shaft 360, and multi-stage compound planetary gear train 361 between shaft 362 and shaft 360. Other hold devices, such as a brake, a magnetic clutch, a toroid motor, or the like, may be used as alternatives. Also, other gear trains may be used to provide a mechanical advantage to the holding torque provided by motor 340A or no gears may be used as alternatives.

Stator 334 is fixed to housing 370 via an interference fit and optionally also glued to housing 370. When motor 340A is energized such that rotor 314 and rotor output shaft 362 are rotationally locked to stator 334 and housing 370, housing 370 will rotate with any rotation of rotor shaft 362 about axis 303. When motor 340A is released, housing 370 with stator 334 are able to rotate relative to reference structure 9 about axis 303 independent of the rotation of rotor 314 relative to reference structure 9.

As shown in FIGS. 6, 7 and 11, rotor shaft 362 of rotor 314 is rigidly coupled to rotor arm 315, which in turn is connected at pivot axis 316 to a first end of linkage 317. In this embodiment, output rotor shaft 362 and rotor arm 315 are portions of a specially formed solid unitary element. However, as an alternative and without limitation, such elements may be separate pieces fixed to each other or otherwise connected.

As shown, rotor arm 315 has a clevis-type end with clevis type pin 315A oriented about pivot axis 316. Linkage 317 comprise a corresponding opening 317A orientated about pivot axis 316 that is configured to receive clevis pin 315A, such that rotor arm 315 is pivotally connected to linkage 317 by the pin joint connection. The pivot connection between rotor arm 315 and linkage 317 at pivot axis 316 is offset a distance from axis of rotation 303.

The other end of linkage 317 is in turn connected at pivot axis 301 to output hub 10. As shown, output hub 10 includes connection arm 46 having a clevis-type end with clevis type pin 46A oriented about pivot axis 301. Linkage 317 comprise a corresponding opening 317B orientated about pivot axis 301 configured to receive clevis pin 46A such that linkage 317 is pivotally connected to connection arm 46 via the pin joint connection. The pivot connection between output hub 10 and linkage 317 at pivot axis 301 is offset a distance from output axis 11. Thus, link 307 is pivotally connected between drive arm portion 305 of rotor 304 and drive arm portion 45 of output hub 10. Link 317 is pivotally connected between drive arm portion 315 of rotor 304 and drive arm portion 46 of output hub 10. However, such couplings may alternatively be a gear coupling, a belt coupling, or other similar couplings.

As shown in FIG. 7, an imaginary line extending between output axis 11 and axis of rotation 303 defines drive axis 308. An imaginary line extending between pivot axis 300 and pivot axis 306 defines linkage axis 309. As shown, the connections between output hub 10, linkage 307 and rotor arm 305 are positioned such that first linkage axis 309 does not intersect first drive axis 308 with rotation of output hub 10 about output axis 11 within the range of rotary motion of actuator system 15. An imaginary line extending between pivot axis 301 and pivot axis 316 defines second linkage axis 319. As shown, the connections between output hub 10, linkage 317 and rotor arm 315 are positioned such that second linkage axis 319 intersects first drive axis 308 with rotation of output hub 10 about output axis 11 within the range of rotary motion of actuator system 15.

With drive motor 340B paired with holding device 340A in housing 370 and with linkage system 13, under normal operation, holding device 340A locks the rotational position between housing 370 and rotor shaft 362 and rotor arm 315. In this configuration, a torque produced by motor 340B and rotor 304 is transferred through linkage 307 and first linkage axis 309 and linkage 317 and second linkage axis 319 and thereby summed at output axis 11 when rotor 314 is restrained from rotating relative to housing 370 within the range of rotary motion of the system. If drive actuator 340B jams or fails, then hold motor 340A releases the lock between stator 334 and rotor 314, and therefore releases housing 370 and rotor shaft 362 and rotor arm 315 so that rotor 314 is substantially free to rotate about axis of rotation 303 relative to housing 370 and such that first linkage 307 and linkage axis 309 and second linkage 317 and linkage axis 319 are substantially free to move with rotation of output hub 10 about output axis 11 relative to structure 9 within its range of rotary motion, which effectively releases any effect motor 340B has on output hub 10. This allows output hub 10 to be driven by actuator 102 and/or actuator 202. Thus, drive motor 340B and hold motor 340A may be controlled so as to go into a bypass mode and rotate freely under the power of the other actuators 102 and/or 202 in system 15. If drive motor 340B fails, actuator 302 operatively drops out of actuator system 15.

As shown in FIG. 6, linkage system 13 is a set of rigid links and pivot joints between output hub 10 and actuators 102, 202 and 302. Under normal operation, in order to cause output hub 10 to rotate counter clockwise about axis 11 relative to reference structure 9, hold rotors 114, 214 and 314 are locked and drive rotors 104, 204 and 304 of rotary actuators 102, 202 and 302 are controlled to rotate clockwise. Under normal operation, in order to cause output hub 10 to rotate clockwise about axis 11 relative to reference structure 9, hold rotors 114, 214 and 314 are locked and drive rotors 104, 204 and 304 of rotary actuators 102, 202 and 302 are controlled to rotate counter clockwise. With linkage system 13, the rotational torque of rotors 104, 204 and 304 of drive motors 140B, 240B and 340B, respectively, is summed together at output hub 10 about axis 11 within the operational range of rotary motion of the system.

In a failure mode, if any of drive motors 140B, 240B and 340B fail, its respective paired hold motor 140B, 240B or 340B is controlled so as to go into a bypass mode and allow the entire subject actuator unit 102, 202 or 302 and housing 170, 270 or 370 to rotate freely about its respective axis 103, 203 or 303 under the power of the other drive actuators 140B, 240B and 340B, transmitted through center hub 10 and linkage 13. Accordingly, one of first actuator 102, second actuator 202 or third actuator 302 may be driven to selectively rotate output hub 10 about output axis 11 even with a failure of one or more of rotors 104, 204 or 304 of drive motors 140B, 240B or 340B to rotate about their respective axis of rotation 103, 203 or 303 relative to respective first housing 170, second housing 270 or third housing 370 within the range of rotary motion of system 15. This provides triple redundancy.

Figure 16:
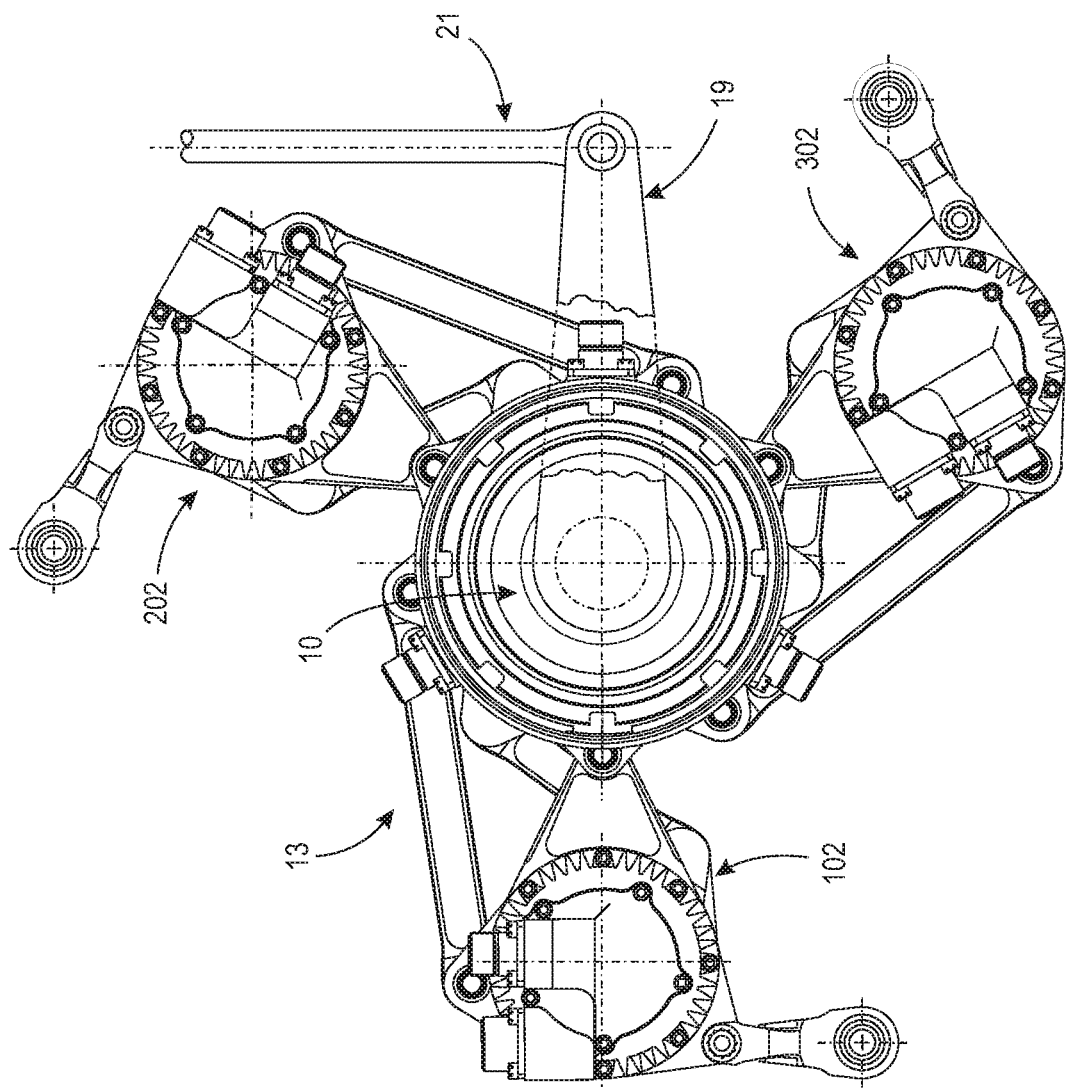
FIG. 16 is an enlarged view of the actuator system connection shown in FIG. 15.
Figure 15:
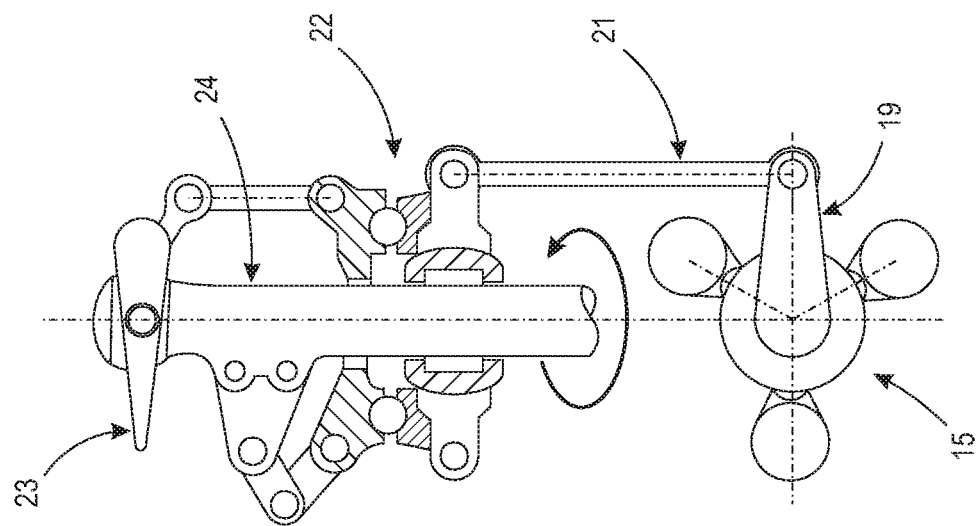
FIG. 15 is a partial schematic and partial perspective view of the actuator system shown in FIG. 2 actuating a swashplate of a helicopter.

FIGS. 15 and 16 show actuator system 15 in use to control conventional swashplate 22 and the pitch of conventional rotor blade 23 mounted on mast 24 of a helicopter. The splined shaft of crank 19 is received in splined bore 40 of output hub 10. The end of crank arm 19 is in turn pivotally connected to one end of swashplate push rod 21, with the other end of push rod 21 connected to swashplate 22. Rotation of hub 10 about axis 11 provides lineal movement of push rod 21 to control conventional swashplate 22, and thereby the pitch of rotor blade 23. As described above, actuator system 15 provides triple redundancy and fault or jam tolerance in the control of swashplate 22, which is critical in this and other flight applications.

Figure 17:
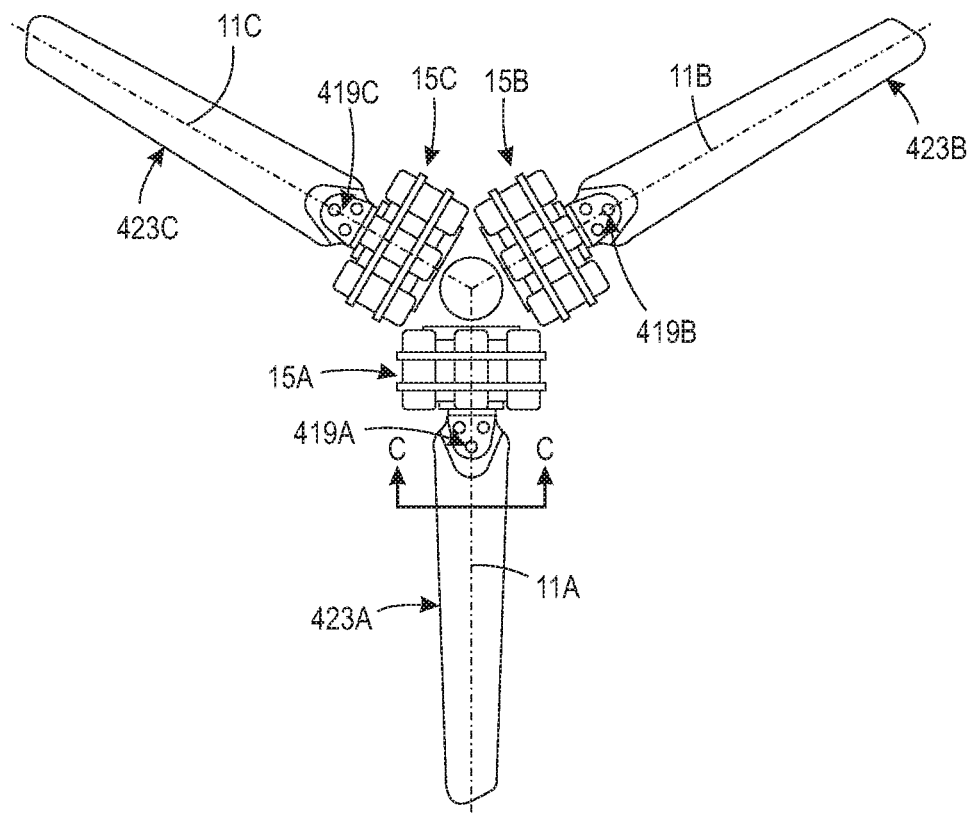
FIG. 17 is a top plane view of the rotor blades of a helicopter with the actuator system shown in FIG. 2 directly actuating the pitch of each of three blades of the helicopter.
Figure 18:
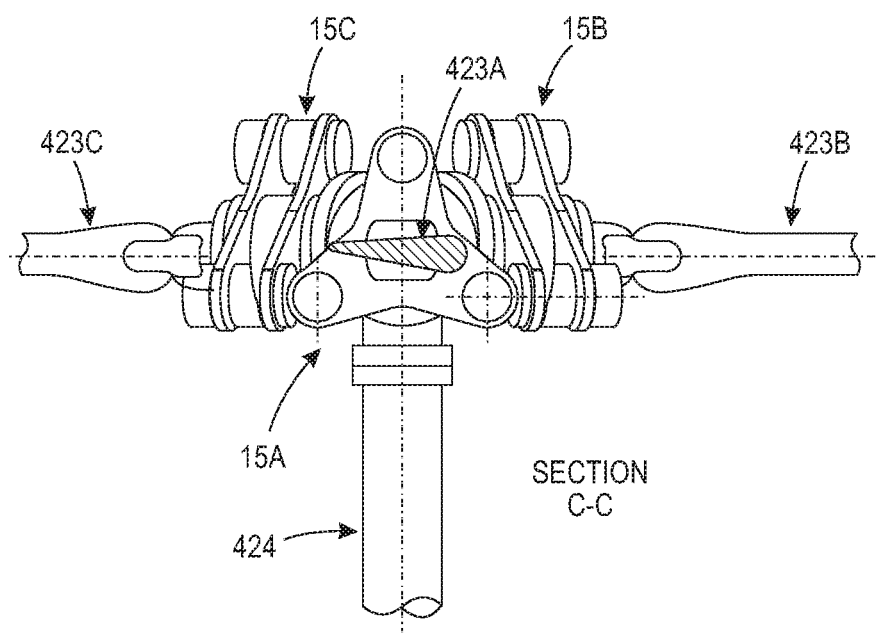
FIG. 18 is a vertical cross sectional view of the assembly shown in FIG. 17, taken generally on line C-C of FIG. 17.

FIGS. 17 and 18 show three actuator systems 15A, 15B and 15C in use to directly control the pitch of conventional rotor blades 423A, 423B and 423C, respectively, mounted on mast 424 of a helicopter. Each of grippers 419A, 419B and 419C on the inner ends of blades 423A, 423B and 423C, respectively, includes a splined inner shaft that is received in splined bore 40 of output hub 10 of actuator systems 15A, 15B and 15C, respectively. Rotation of hub 10 of actuator system 15A about axis 11A provides rotational movement of blade 423A about aligned blade axis 11A to control the pitch of blade 423A. Similarly, rotation of hub 10 of actuator system 15B about axis 11B provides rotational movement of blade 423B about aligned blade axis 11B to control the pitch of blade 423B, and rotation of hub 10 of actuator system 15C about axis 11C provides rotational movement of blade 423C about aligned blade axis 11C to control the pitch of blade 423C. As described above, each of actuator systems 15A, 15B and 15C provides triple redundancy and fault or jam tolerance in the control of blades 423A, 423B and 423C, respectively, which is critical in this and other flight applications.

Figure 19:
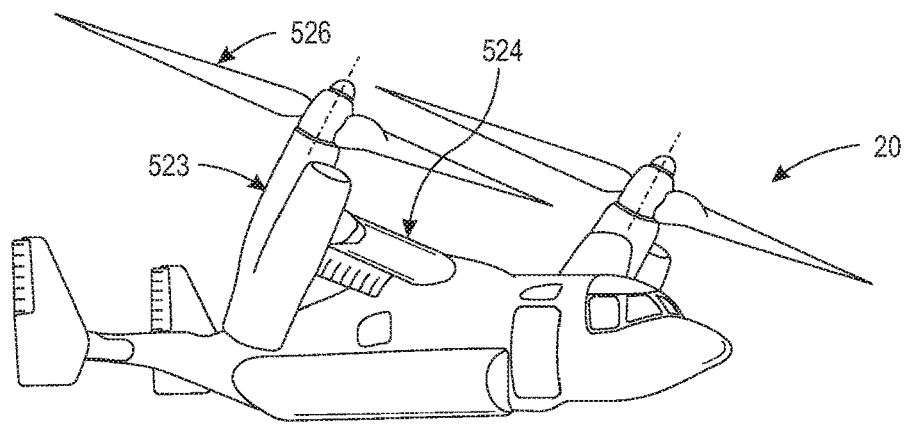
FIG. 19 is a perspective view of a tiltrotor.
Figure 20:
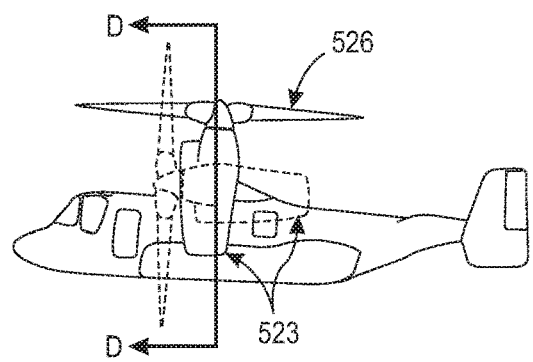
FIG. 20 is a side view of the tiltrotor shown in FIG. 19 illustrating the rotation of the rotor nacelle.
Figure 21:
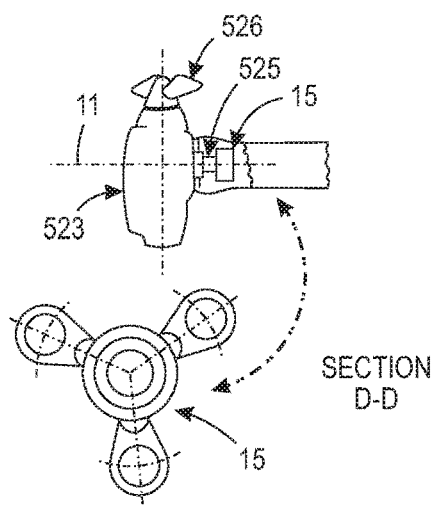
FIG. 21 is a vertical transverse cross sectional view of the rotor nacelle shown in FIG. 20, taken generally on line D-D of FIG. 20.

FIGS. 19-21 show actuator system 15 in use to control the tilt of conventional rotor nacelle 523 of tiltrotor 20. As shown, actuator system 15 is mounted in wing 524 of tiltrotor 10. Rotor nacelle 523 includes splined shaft 524 that is received in splined bore 40 of output hub 10 of actuator system 15. Rotation of hub 10 of actuator system 15 about axis 11 provides rotational movement of rotor nacelle about axis 11 to control the tilt of rotor nacelle 523 and the angle of the plane of rotation of blades 526 between horizontal and vertical. As described above, actuator system 15 provides triple redundancy and fault or jam tolerance in the control of rotor nacelle 523, which is critical in this and other flight applications.

System 15 provides a redundant actuation system having multiple lanes of output even after failure of power, command or feedback. System 15 also provides continual power and output motion even after an internal mechanical failure that would in other systems cause a jam or locked output.

Figure 13:
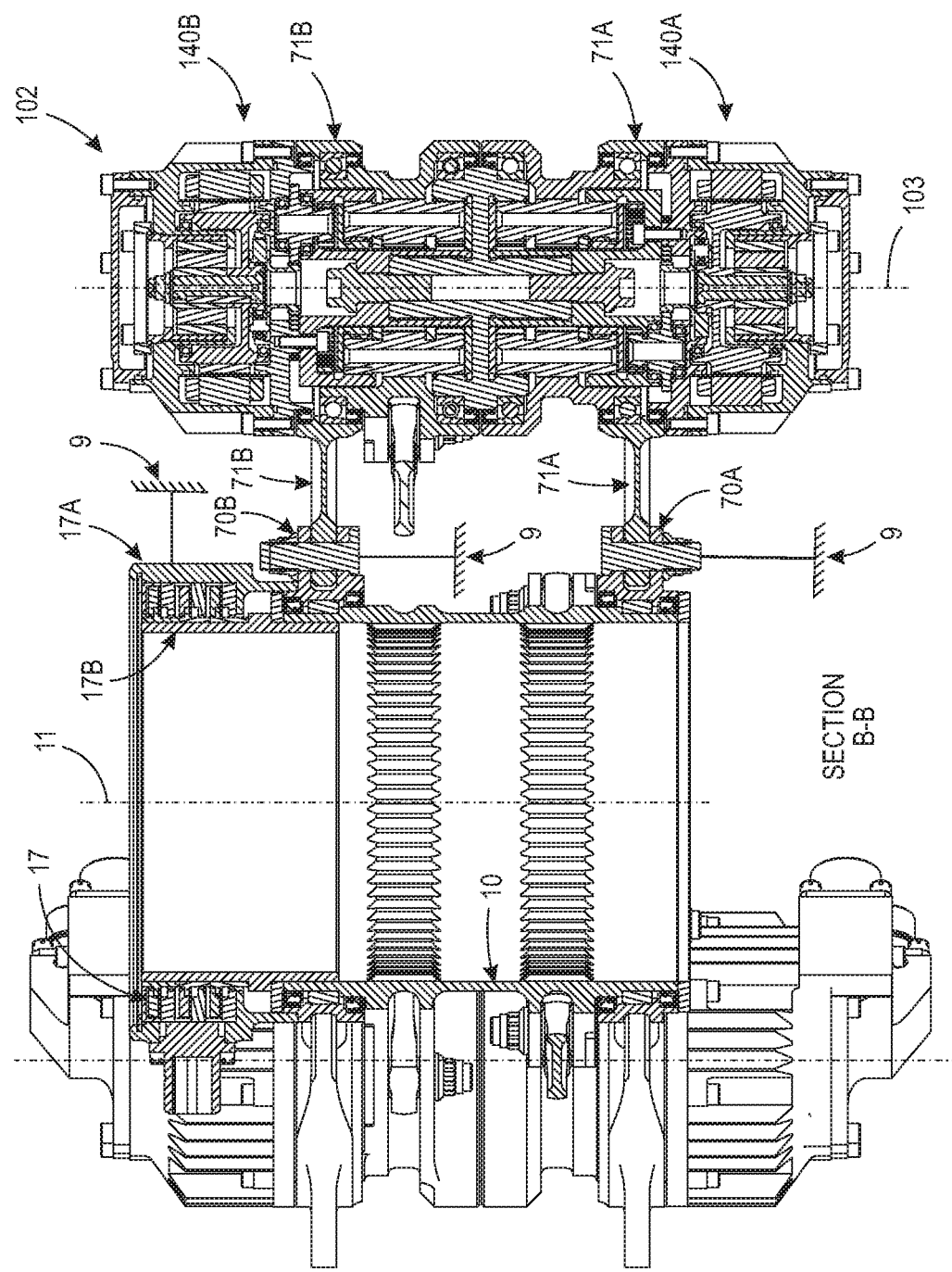
FIG. 13 is a longitudinal horizontal cross-sectional view of the actuator system shown in FIG. 3, taken generally on line B-B of FIG. 3.

Several modifications can be made to the disclosed embodiments. For example and without limitation, additional actuators having the functionality described above may be added to the system to provide further redundancy. Also, position sensors, resolvers, and/or encoders may be added to actuators and/or any other linkage joint in order to provide useful feedback to a controller. For example, as shown in FIGS. 1 and 13, resolver 17 having stator 17A fixed to structure 12 and opposed rotor 17A rotating with center hub 10 may be provided at one end of structure 12 to determine the rotational position of hub 10 relative to structure 12. In addition, resolvers 147A, 247A and 347A may be included in drive motors 140A, 240A and 340A to commutate the position of rotors 104, 204 and 304, respectively, based on the input command from the controller. Resolvers 147B, 247B and 347B may be included in hold motors 140B, 240B and 340B, respectively, to monitor the status of such hold devices. Furthermore, additional torque sensors, position sensors and/or tachometers may be added to each actuator output and/or any other link joint in linkage system 13 to provide further feedback.

Therefore, while the presently-preferred form of the actuator system has been shown and described, and several modifications discussed, persons skilled in this art will readily appreciate that various additional changes may be made without departing from the scope of the invention.

What is claimed is:

1. A rotary actuator assembly comprising:
an output member configured to impart a limited range of rotary motion to a driven object about a rotary output axis relative to a structure;
a first sub-actuator having a first sub-axis of rotation and a first sub-actuator housing, said first sub-actuator housing being substantially free to rotate about said first sub-axis of rotation relative to said structure;
said first sub-actuator comprising a first stator element and a first rotor configured to selectively rotate about said first sub-axis of rotation relative to said first sub-actuator housing;
a first drive axis defined by an imaginary line extending between said output axis and said first sub-axis of rotation;
a first member connected to said first rotor and having a first member pivot axis, said first member pivot axis offset a distance from said first sub-axis of rotation;
a first linkage connected to said first member at said first member pivot axis and connected to said output member at a first output pivot axis, said first output pivot axis offset a distance from said output axis;
said first linkage having a first linkage axis defined by an imaginary line extending between said first output pivot axis and said first member pivot axis;
said output member, said first member of said first sub-actuator and said first linkage of said first sub-actuator configured such that said first linkage axis does not intersect said first drive axis with rotation of said output member about said output axis within said range of rotary motion;
said first sub-actuator comprising a second stator element and a second rotor configured to selectively rotate about said first sub-axis of rotation relative to said first sub-actuator housing;

a second member connected to said second rotor and having a second member pivot axis, said second member pivot axis offset a distance from said first sub-axis of rotation;

a second linkage connected to said second member at said second member pivot axis and connected to said output member at a second output pivot axis, said second output pivot axis offset a distance from said output axis;

said second linkage having a second linkage axis defined by an imaginary line extending between said second output pivot axis and said second member pivot axis;

said output member, said second member of said first sub-actuator and said second linkage of said first sub-actuator configured such that said second linkage axis intersects said first drive axis with rotation of said output member about said output axis within said range of rotary motion;

wherein a torque produced by said first rotor is transferred through said first linkage axis and said second linkage axis and thereby summed at said output axis when said second rotor is restrained from rotating relative to said first sub-actuator housing within said range of rotary motion;

wherein said second rotor may be selectively released so that it is substantially free to rotate about said first sub-axis of rotation relative to said first sub-actuator housing with a failure of said first rotor to rotate about said first sub-axis of rotation relative to said first sub-actuator housing, such that said first linkage axis and said second linkage axis are substantially free to move with rotation of said output member about said output axis relative to said structure within said range of rotary motion;

a second sub-actuator having a second sub-axis of rotation and a second sub-actuator housing, said second sub-actuator housing being substantially free to rotate about said second sub-axis of rotation relative to said structure;

said second sub-actuator comprising a third stator element and a third rotor configured to selectively rotate about said second sub-axis of rotation relative to said second sub-actuator housing;

a second drive axis defined by an imaginary line extending between said output axis and said second sub-axis of rotation;

a third member connected to said third rotor and having a third member pivot axis, said third member pivot axis offset a distance from said second sub-axis of rotation;

a third linkage connected to said third member at said third member pivot axis and connected to said output member at a third output pivot axis, said third output pivot axis offset a distance from said output axis;

said third linkage having a third linkage axis defined by an imaginary line extending between said third output pivot axis and said third member pivot axis;

said output member, said third member of said second sub-actuator and said third linkage of said second sub-actuator configured such that said third linkage axis does not intersect said second drive axis with rotation of said output member about said output within said range of rotary motion;

said second sub-actuator comprising a fourth stator element and a fourth rotor configured to selectively rotate about said second sub-axis of rotation relative to said second sub-actuator housing;

a fourth member connected to said fourth rotor and having a fourth member pivot axis, said fourth member pivot axis offset a distance from said second sub-axis of rotation;

a fourth linkage connected to said fourth member at said fourth member pivot axis and connected to said output member at a fourth output pivot axis, said fourth output pivot axis offset a distance from said output axis;

said fourth linkage having a fourth linkage axis defined by an imaginary line extending between said fourth output pivot axis and said fourth member pivot axis;

said output member, said fourth member of said second sub-actuator and said fourth linkage of said second sub-actuator configured such that said fourth linkage axis intersects said second drive axis with rotation of said output member about said output axis within said range of rotary motion;

wherein a torque produced by said third rotor is transferred through said third linkage axis and said fourth linkage axis and thereby summed at said output axis when said fourth rotor is restrained from rotating relative to said second sub-actuator housing within said range of rotary motion;

wherein said fourth rotor may be selectively released so that it is substantially free to rotate about said second sub-axis of rotation relative to said second sub-actuator housing with a failure of said third rotor to rotate about said second sub-axis of rotation relative to said second sub-actuator housing such that said third linkage axis and said fourth linkage axis are substantially free to move with rotation of said output member about said output axis relative to said structure within said range of rotary motion; and wherein one of said first sub-actuator or said second sub-actuator may be driven to selectively rotate said output member about said output axis with a failure of said first rotor or said third rotor of said other of said first sub-actuator and said second sub-actuator to rotate about said respective first sub-axis of rotation or said second sub-axis of rotation relative to said respective first sub-actuator housing or said second sub-actuator housing within said range of rotary motion.

2. The rotary actuator assembly as set forth in claim 1, and further comprising:

a third sub-actuator having a third sub-axis of rotation and a third sub-actuator housing, said third sub-actuator housing being substantially free to rotate about said third sub-axis of rotation relative to said structure;

said third sub-actuator comprising a fifth stator element and a fifth rotor configured to selectively rotate about said third sub-axis of rotation relative to said second sub-actuator housing;

a third drive axis defined by an imaginary line extending between said output axis and said third sub-axis of rotation;

a fifth member connected to said fifth rotor and having a fifth member pivot axis, said fifth member pivot axis offset a distance from said third sub-axis of rotation;

a fifth linkage connected to said fifth member at said fifth member pivot axis and connected to said output member at a fifth output pivot axis, said fifth output pivot axis offset a distance from said output axis;

said fifth linkage having a fifth linkage axis defined by an imaginary line extending between said fifth output pivot axis and said fifth member pivot axis;

said output member, said fifth member of said third sub-actuator and said fifth linkage of said third sub-actuator configured such that said fifth linkage axis does not intersect said third drive axis with rotation of said output member about said output axis within said range of rotary motion;

said third sub-actuator comprising a sixth stator element and a sixth rotor configured to selectively rotate about said third sub-axis of rotation relative to said third sub-actuator housing;

a sixth member connected to said sixth rotor and having a sixth member pivot axis, said sixth member pivot axis offset a distance from said third sub-axis of rotation;

a sixth linkage connected to said sixth member at said sixth member pivot axis and connected to said output member at a sixth output pivot axis, said sixth output pivot axis offset a distance from said output axis;

said sixth linkage having a sixth linkage axis defined by an imaginary line extending between said sixth output pivot axis and said sixth member pivot axis;

said output member, said sixth member of said third sub-actuator and said sixth linkage of said third sub-actuator configured such that said sixth linkage axis intersects said third drive axis with rotation of said output member about said output axis within said range of rotary motion;

wherein a torque produced by said fifth rotor is transferred through said fifth linkage axis and said sixth linkage axis and thereby summed at said output axis when said sixth rotor is restrained from rotating relative to said third sub-actuator housing within said range of rotary motion;

wherein said sixth rotor may be selectively released so that it is substantially free to rotate about said third sub-axis of rotation relative to said third sub-actuator housing with a failure of said fifth rotor to rotate about said third sub-axis of rotation relative to said third sub-actuator housing such that said fifth linkage axis and said sixth linkage axis are substantially free to move with rotation of said output member about said output axis relative to said structure within said range of rotary motion; and wherein one of said first sub-actuator, said second sub-actuator or said third sub-actuator may be driven to selectively rotate said output member about said output axis with a failure of one or more of said first rotor, said third rotor or said fifth rotor of said other of said first sub-actuator, said second sub-actuator or said third sub-actuator to rotate about said respective first sub-axis of rotation, said second sub-axis of rotation and said third sub-axis of rotation relative to said respective first sub-actuator housing, said second sub-actuator housing or said third sub-actuator housing within said range of rotary motion.

3. The actuator system as set forth in claim 2, wherein said first sub-axis of rotation, said second sub-axis of rotation and said third sub-axis of rotation are circumferentially spaced about a circle having said rotary output axis as a center axis.

4. The rotary actuator system as set forth in claim 1, wherein said driven object is selected from a group consisting of a swashplate of a helicopter, a helicopter rotor blade, an aircraft flight control surface, and a rotor nacelle of a tiltrotor.

5. The rotary actuator system as set forth in claim 4, wherein:

said driven object comprises said swashplate of a helicopter and said output member is connected to said swashplate via a pushrod; or said driven object comprises said helicopter rotor blade and said output member is connected to said rotor blade and configured to control a pitch angle of said rotor blade; or said driven object comprises said aircraft flight control surface and said output member is connected to said flight control surface via a torque tube.

6. The rotary actuator system as set forth in claim 5, wherein:

said driven object comprises said swashplate of a helicopter and said output member is connected to said swashplate via said pushrod and comprising a crank between said output member and said pushrod; or said driven object comprises said helicopter rotor blade and said output member is connected to said rotor blade and comprising a grip between said output member and said rotor blade.

7. The rotary actuator system as set forth in claim 1, wherein said range of motion is less than or equal to about 90 degrees about said rotary output axis.

8. The rotary actuator system as set forth in claim 1, wherein said first sub-axis of rotation, said second sub-axis of rotation, said rotary output axis, said first member pivot axis, said second member pivot axis, said third member pivot axis, said fourth member pivot axis, said first output pivot axis, said second output pivot axis, said third output pivot axis, and said fourth output pivot axis are all substantially parallel.

9. The rotary actuator system as set forth in claim 1, wherein said first stator element and said second stator element are fixed to said first sub-actuator housing via an interference fit and said third stator element and said fourth stator element are fixed to said second sub-actuator housing via an interference fit.

10. The rotary actuator system as set forth in claim 1, wherein said first rotor and said first stator comprise a brushless DC permanent magnet motor configured to drive said first rotor about said first sub-axis of rotation relative to said first sub-actuator housing, and wherein said third rotor and said third stator comprise a brushless DC permanent magnet motor configured to drive said third rotor about said second sub-axis of rotation relative to said second sub-actuator housing.

11. The rotary actuator system as set forth in claim 1, wherein said second rotor and said second stator comprise an electromagnetic reluctance hold device configured to selectively restrain said second rotor from rotating about said first sub-axis of rotation relative to said first sub-actuator housing and to selectively release said second rotor so that it is substantially free to rotate about said first sub-axis of rotation relative to said first sub-actuator housing within said range of rotary motion, and wherein said fourth rotor and said fourth stator comprise an electromagnetic reluctance hold device configured to selectively restrain said fourth rotor from rotating about said second sub-axis of rotation relative to said second sub-actuator housing within said range of rotary motion and to selectively release said fourth rotor so that it is substantially free to rotate about said second sub-axis of rotation relative to said first sub-actuator housing within said range of rotary motion.

12. The rotary actuator system as set forth in claim 1, wherein said first rotor comprises a first input rotor shaft, a first output rotor shaft and a first gear train between said first input rotor shaft and said first output rotor shaft, and wherein said third rotor comprises a third input rotor shaft, a third output rotor shaft and a third gear train between said third input rotor shaft and said third output rotor shaft, and wherein said second rotor comprises a second input rotor shaft, a second output rotor shaft and a second gear train between said second input rotor shaft and said second output rotor shaft, and wherein said fourth rotor comprises an fourth input rotor shaft, a fourth output rotor shaft and a fourth gear train between said fourth input rotor shaft and said fourth output rotor shaft.

13. The rotary actuator system as set forth in claim 12, wherein said first gear train and third gear train each comprise a multi-stage planetary gear.

14. The rotary actuator system as set forth in claim 1, wherein said first member and said first rotor are portions of a first specially formed solid unitary element and wherein said second member and said second rotor are portions of a second specially formed solid unitary element.

15. The rotary actuator system as set forth in claim 1, wherein each of said first member, second member, third member and fourth member comprises and a clevis-type end with a clevis type pin oriented about said respective first member pivot axis, said second member pivot axis, said third member pivot axis and said fourth member pivot axis, and each of said respective first linkage, second linkage, third linkage and fourth linkage comprise a corresponding opening orientated about said respective first member pivot axis, said second member pivot axis, said third member pivot axis and said fourth member pivot axis configured to receive said respective clevis pin, and said respective first member, second member, third member and fourth member are pivotally connected to said respective first linkage, second linkage, third linkage and fourth linkage via said respective pin joint connections.

16. The rotary actuator system as set forth in claim 15, wherein said output member comprises a center hub having a first connection arm, a second connection arm, a third connection arm and a fourth connection arm, and wherein each of said first connection arm, second connection arm, third connection arm and fourth connection arm comprises a clevis-type end with a clevis type pin oriented about said respective first output pivot axis, said second output pivot axis, said third output pivot axis and said fourth output pivot axis, and wherein each of said respective first linkage, second linkage, third linkage and fourth linkage comprise a corresponding opening orientated about said respective first output pivot axis, said second output pivot axis, said third output pivot axis and said fourth output pivot axis configured to receive said respective clevis pins, and wherein said respective first linkage, second linkage, third linkage and fourth linkage are pivotally connected to said respective first connection arm, second connection arm, third connection arm and fourth connection arm of said output member via said respective pin joint connections.

17. The rotary actuator system as set forth in claim 1, wherein each of said first linkage, second linkage, third linkage and fourth linkage comprises a single bar linkage.

18. The rotary actuator system as set forth in claim 1, wherein said output member comprises a cylindrical hollow shaft and said structure comprises a center collar having an opening orientated about said output axis and configured to receive said shaft of said output member.

19. The rotary actuator system as set forth in claim 18, wherein said structure comprises a first strongback arm extending radially from said center collar and a second strongback arm extending radially from said center collar.

20. The rotary actuator system as set forth in claim 19, wherein said first strongback arm is configured to support said first sub-actuator such that said first sub-actuator housing of said first sub-actuator is rotatable about said first sub-axis of rotation relative to said first strongback arm and wherein said second strongback arm is configured to support said second sub-actuator such that said second sub-actuator housing of said second sub-actuator is rotatable about said second sub-axis of rotation relative to said second strongback arm.

21. The rotary actuator system as set forth in claim 20, wherein said first strongback arm comprises an opening orientated about said first sub-axis of rotation configured to receive said first sub-actuator housing of said first sub-actuator and said second strongback arm comprises an opening orientated about said second sub-axis of rotation configured to receive said second sub-actuator housing of said second sub-actuator.

22. The rotary actuator system as set forth in claim 21, wherein said first strongback arm is pivotally connected to said center collar and further comprising a kick link connected to both said first strongback arm and said structure.

23. The rotary actuator system as set forth in claim 21, wherein said center collar is fixed to a fuselage of an aircraft.

24. The rotary actuator system as set forth in claim 19, wherein said center collar, said first strongback arm and said second strongback arm comprise a first solid unitary member, and comprising a second center collar, a third strongback arm and a fourth strongback arm comprising a second solid unitary member parallel to said first solid unitary member.

25. The rotary actuator system as set forth in claim 1, wherein said failure comprises a mechanical jam, an electrical motor failure or a loss of power.

26. The rotary actuator system as set forth in claim 1, wherein said second stator element and said second rotor comprise a releasable brake.

* * * * *